United States Patent
Katou et al.

(10) Patent No.: US 7,496,157 B2
(45) Date of Patent: Feb. 24, 2009

(54) APPARATUS FOR DETECTING A DISTANCE AND APPARATUS FOR DETECTING A BODY

(75) Inventors: Kouji Katou, Nagoya (JP); Masakazu Takeichi, Okazaki (JP); Yoshihisa Sato, Nagoya (JP); Toshihiro Hattori, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 566 days.

(21) Appl. No.: 11/005,020

(22) Filed: Dec. 7, 2004

(65) Prior Publication Data

US 2005/0135190 A1 Jun. 23, 2005

(30) Foreign Application Priority Data

| Dec. 17, 2003 | (JP) | ............................. 2003-420010 |
| Feb. 6, 2004 | (JP) | ............................. 2004-031244 |
| Jun. 16, 2004 | (JP) | ............................. 2004-178739 |

(51) Int. Cl.
*H03D 1/00* (2006.01)

(52) U.S. Cl. ........................ 375/340; 375/150; 375/219; 375/316; 375/343; 342/25 R; 342/131

(58) Field of Classification Search ......... 375/340–341, 375/375, 136, 147, 150, 219, 229, 316, 317, 375/324, 343; 342/131, 25, 192
See application file for complete search history.

(56) References Cited

U.S. PATENT DOCUMENTS 4,376,990 A 3/1983 Metchev

| 5,229,775 A | 7/1993 | Sakamoto et al. |
| 5,745,437 A | 4/1998 | Wachter et al. |
| 5,889,490 A | 3/1999 | Wachter et al. |

(Continued)

FOREIGN PATENT DOCUMENTS

DE 37 21 213 C2 1/1989

(Continued)

OTHER PUBLICATIONS

Akira Umeda et al., "Report of Study Committee on the Facial Detection of a Static Structure by using an Ultrasonic Sensor", 3-2-6 Ultrasonic Signal Processing, pp. 50-60, Jun. 1, 1992, Foundation Nihon Plant Maintenance Association.

(Continued)

*Primary Examiner*—Shuwang Liu
*Assistant Examiner*—Hirdepal Singh
(74) *Attorney, Agent, or Firm*—Posz Law Group, PLC

(57) ABSTRACT

In an apparatus for detecting a distance and improving the SN ratio of received signals, an angular frequency ($\omega_1$) of sinusoidal wave signals generated by a sinusoidal wave generator is brought into synchronism with an angular frequency ($\omega$) of burst pulse signals, and signals received by a transmitter/receiver microphone are orthogonally demodulated by using sinusoidal wave signals of the synchronized angular frequency. A microcomputer adds up the vectors of the demodulated signals for only a period of time equal to a section of transmitting the transmission waves from the transmitter/receiver microphone. A distance to a body is detected by using the received signals of which the vectors are added up.

15 Claims, 13 Drawing Sheets

U.S. PATENT DOCUMENTS

| | | | |
|---|---|---|---|
| 6,251,077 | B1 | 6/2001 | Mo et al. |
| 6,442,383 | B1 | 8/2002 | Iemura |
| 6,663,565 | B2 | 12/2003 | Kawagishi et al. |
| 6,753,803 | B2 | 6/2004 | Szajnowski |
| 7,151,477 | B2 | 12/2006 | Szajnowski |
| 2001/0012238 | A1* | 8/2001 | Iwasaki et al. ............... 367/99 |
| 2004/0178948 | A1* | 9/2004 | Axelsson ................... 342/118 |
| 2006/0023776 | A1* | 2/2006 | Hsu ........................... 375/150 |
| 2006/0273948 | A1* | 12/2006 | Falk ............................ 342/89 |
| 2007/0001896 | A1* | 1/2007 | Hellsten ................... 342/25 D |
| 2008/0125070 | A1* | 5/2008 | Grieco et al. ............... 455/255 |

FOREIGN PATENT DOCUMENTS

| | | |
|---|---|---|
| EP | 0282265 | 9/1988 |
| EP | 0 336 027 A1 | 11/1989 |
| GB | 2314628 | 1/1998 |
| JP | A-S60-205385 | 10/1985 |
| JP | 06186328 | 7/1994 |
| JP | A-06-249950 | 9/1994 |
| JP | A-9-211109 | 8/1997 |
| JP | A-9-257920 | 10/1997 |
| JP | A-H11-030661 | 2/1999 |
| JP | A-H11-118906 | 4/1999 |
| JP | A-11-231043 | 8/1999 |
| JP | A-H11-281734 | 10/1999 |
| JP | A-2000-046943 | 2/2000 |
| JP | A-2001-033542 | 2/2001 |
| JP | A-2002-107447 | 4/2002 |
| JP | A-2002-243840 | 8/2002 |
| JP | A-2003-218969 | 7/2003 |

OTHER PUBLICATIONS

First Office Action from Chinese Patent Office issued on Oct. 13, 2006 for the corresponding Chinese patent application No. 200410082151.2 (a copy and English translation thereof).

Office Action mailed Aug. 5, 2008 in corresponding Japanese Patent Application No. 2004-178739 (and English translation).

* cited by examiner

DIFF VECTORS GROUP

DIFF SYNTHETIC VECTOR

ALL DIFF VECTOR SIGNS IN AGREEMENT

TWO SIGNS ARE NOT IN AGREEMENT

APPARATUS FOR DETECTING A DISTANCE AND APPARATUS FOR DETECTING A BODY

CROSS REFERENCE TO RELATED APPLICATIONS

This application is based upon, claims the benefit of priority of, and incorporates by reference the contents of, Japanese Patent Application No. 2003-420010 filed on Dec. 17, 2003, Japanese Patent Application No. 2004-31244 filed on Feb. 6, 2004, and Japanese Patent Application No. 2004-178739 filed on Jun. 16, 2004.

FIELD OF THE INVENTION

This invention relates to an apparatus for detecting a distance and an apparatus for detecting a body.

BACKGROUND OF THE INVENTION

There has heretofore been proposed an ultrasonic distance measuring apparatus for measuring a distance to a reflecting body by transmitting ultrasonic waves and receiving reflected waves thereof. According to this ultrasonic distance measuring apparatus, the received signals are passed through a band-pass filter to obtain frequency components only of the transmitted signals, and the obtained signals are detected for their envelope to detect the rising portions (edge portions) of the received signals. Then, the time is measured from the rising portions of the transmitted signals to measure the distance to the reflecting body.

There has further been known a pulse compression method in which modulated signals obtained by modulating a frequency or a phase of pulse signals are transmitted, the reflected waves thereof are received, and a correlation (self-correlation) to the modulated signals is obtained to compress the pulse width of the received signals (see, for example, non-patent document 1: Akira UMEDA and 12 others, "Report of Study Committee on the Facial Detection of a Static Structure by using an Ultrasonic Sensor", 3-2-6 Ultrasonic Signal Processing, pp. 50-60, [online], Jun. 1, 1992, Foundation Nihon Plant Maintenance Association, retrieved May 24, 2004, <URL: http://www.jipm.or.jp/giken/houkoku/index.htm>).

In the above conventional ultrasonic distance measuring apparatus, the frequency components of transmission signals are obtained through the band-pass filter, making it difficult to remove noise components in the frequency components that pass through the band-pass filter. Therefore, signals having a good SN ratio are not received.

According to the above pulse compression method, further, improvement in the SN ratio can be expected to some extent for the static body (which is not moving) but the pulse cannot be favorably compressed for the received signals reflected by a body that is uniformly moving. This is because when the body is uniformly moving, the frequency of the received signals of reflected waves is shifted by the Doppler effect. When the pulses are compressed, therefore, no correlation is maintained relative to the modulated signals and, as a result, the pulse widths of the received signals are not compressed as desired.

SUMMARY OF THE INVENTION

This invention was accomplished in view of the above problems, and its object is to provide an apparatus for detecting a distance and an apparatus for detecting a body, which are capable of improving the SN (signal to noise) ratio of the received signals.

An apparatus for detecting a distance according to a first aspect comprises: pulse signal-generating means for generating pulse signals; transmitter/receiver means for transmitting transmission waves by driving a piezoelectric element by pulse signals generated by the pulse signal-generating means and for receiving the reflected waves thereof; sinusoidal wave signal generating means for generating sinusoidal wave signals of a frequency in synchronism with the frequency of pulse signals used for driving the piezoelectric element; orthogonal demodulation means which orthogonally demodulates the signals of reflected waves received by the transmitter/receiver means by using sinusoidal wave signals generated by the sinusoidal wave signal generating means, and produces the demodulated signals; and distance detecting means for detecting a distance to a body based on the pulse signals generated by the pulse signal-generating means and on the demodulated signals produced by the orthogonal demodulation means.

The transmission waves transmitted by the transmitter/receiver means and the reflection waves thereof have nearly the same frequency component, i.e., the signals of the reflected waves are orthogonally demodulated by using sinusoidal wave signals of a frequency in synchronism with the pulse signals that are used for driving the piezoelectric element. For example, when the pulse signal-generating means generates pulse signals f[t] of an angular frequency ($\omega$) as burst signals and a piezoelectric element is driven by the burst signals, a fundamental component of transmission wave signals transmitted by driving the piezoelectric element is expressed by the following formula (1). In the following formula (1), ($\theta$) represents the phase difference formed when the transmission waves propagate through a passage along which the transmission waves are reflected by the body to be detected and are received.

$$\text{Transmission waves} = f[t] \times \cos(\omega t + \theta) \quad (1)$$

If the reflection wave signals having a frequency component nearly equal to the transmission waves are orthogonally demodulated by the orthogonal demodulation means using sinusoidal wave signals of an angular frequency ($\omega_1$), there are obtained the demodulated signals as expressed by the following formula (2), $$\text{Demodulated signals} = f[t] \times \cos(\omega t + \theta) \times \cos(\omega_1 t) + j\{f[t] \times \cos(\omega t + \theta) \times -\sin(\omega_1 t)\} = (\tfrac{1}{2}) \times f[t] \times \{\cos(\omega t + \theta + \omega_1 t) + \cos(\omega t + \theta - \omega_1 t)\} - (\tfrac{1}{2}) \times j\{\sin(\omega t + \theta + \omega_1 t) + \sin(-\omega t - \theta + \omega_1 t)\} \quad (2)$$

When the orthogonal demodulation is effected with the sinusoidal wave signals of the angular frequency ($\omega_1$), the demodulated signals are obtained in a form being separated into signals of the in-phase component (I) and the orthogonal component (Q)(term to which j is imparted) for the sinusoidal wave signals.

Here, when the orthogonal demodulation is effected by the orthogonal demodulation means by using sinusoidal wave signals of an angular frequency ($\omega_1 = \omega$) in synchronism with the angular frequency ($\omega$) of the pulse signals formed by the sinusoidal wave signal generating means, the demodulated signals are expressed by the following formula (3), $$\text{Demodulated signals} = (\tfrac{1}{2}) \times f[t] \times \{\cos(\omega t + \theta + \omega t) + \cos(\omega t + \theta - \omega t)\} - (\tfrac{1}{2}) \times j\{\sin(\omega t + \theta + \omega t) + \sin(-\omega t - \theta + \omega t)\} = (\tfrac{1}{2}) \times f[t] \times \{\cos(2\omega t + \theta) + \cos(\theta)\} - (\tfrac{1}{2}) \times j\{\sin(2\omega t + \theta) + \sin(-\theta)\} \quad (3)$$

If the component of a frequency twice as great as the angular frequency ($\omega$) is removed from demodulated signals expressed by the above formula (3) by using a low-pass filter (LPF) having a function of the orthogonal demodulation means, the output from the LPF is expressed by the following formula (4), $$LPF_{output} = (1/2) \times f[t] \times +\cos(\theta)+j(1/2)\times\sin(\theta) = A\times f\{t\}\times e^{j\theta} \quad (4)$$

where A is a constant.

As described above, the signals of reflection waves of a frequency component nearly equal to that of the transmission waves are orthogonally demodulated with sinusoidal wave signals of an angular frequency in synchronism with the angular frequency (ω) of pulse signals for oscillating the piezoelectric element to remove components of a frequency twice as high contained in the demodulated signals and, hence, to obtain pulse signals f[t] having a phase difference (θ) and an amplitude of (1/A) times as great.

Referring, for example, to FIG. 5B illustrating a complex plane (IQ plane) consisting of a signal of the in-phase component (I) and a signal of an orthogonal component (Q), a demodulated signal from which the component of a frequency of twice as high is removed becomes a vector representing the same direction (a point on the IQ plane) at all times in a section where the burst pulse signals are transmitted in FIG. 5A.

Therefore, the orthogonally demodulated signals are sampled at a predetermined sampling frequency for a period of time equal to a section of transmitting the transmission waves, and the sampled and demodulated signals are added up (addition of vectors) for each in-phase component and orthogonal component to obtain a vector of a length (magnitude) proportional to the number of times of addition as shown in FIG. 6A.

Referring, for example, to FIG. 7, the addition of vectors stands for plotting the added results of 10 samples from each time of the sampled result. As shown in FIG. 7, the plotted result of addition assumes a maximum value at a time ($t_a$) when the sampled result has risen. A distance to a body is detected from a time difference between the time of starting the transmission of transmission waves and the time when the plotted result of addition becomes a maximum.

On the other hand, demodulated signals obtained by the orthogonal demodulation by using sinusoidal wave signals of an angular frequency ($\omega_1$) which is not in synchronism with the burst pulse signals, represents vectors in different directions on the IQ plane as shown in FIG. 5C. When, for example, the angular frequency ($\omega_1$) is smaller than the angular frequency (ω), the vectors represented on the IQ plane rotate with the origin as a center. Therefore, the added result of vectors does not become a large vector despite of addition as shown in FIG. 6B.

Namely, the signals of reflection waves of a frequency component nearly the same as that of the transmission waves are orthogonally demodulated with the sinusoidal wave signals of an angular frequency in synchronism with the angular frequency (ω) of pulse signals for exciting the piezoelectric element, the demodulated signals from which the component of a frequency twice as high is removed, are added up for their vectors, and the body is detected by using the demodulated signals of which the vectors are added up to detect a distance up to the body by using the demodulated signals having an improved SN ratio.

An apparatus for detecting a distance according to a second aspect of the invention comprises: pulse signal-generating means for generating pulse signals; transmitter/receiver means for transmitting transmission waves based upon pulse signals generated by the pulse signal-generating means and for receiving the reflected waves thereof, the transmitter/receiver means including an oscillation unit that oscillates upon receiving the reflected waves; sinusoidal wave signal generating means for generating sinusoidal wave signals at a frequency nearly equal to a resonance frequency of the oscillation unit; orthogonal demodulation means which orthogonally demodulates the signals of reflected waves received by the transmitter/receiver means by using sinusoidal wave signals generated by the sinusoidal wave signal generating means, and produces the demodulated signals; and distance detecting means for detecting a distance to a body based on the pulse signals generated by the pulse signal-generating means and on the demodulated signals produced by the orthogonal demodulation means.

Usually, the frequency of transmission waves transmitted from the transmitter/receiver means is set in advance to be in agreement with a resonance frequency of the oscillation unit, so that the oscillation unit in the transmitter/receiver means will efficiently receive the reflected waves. Therefore, the action and effect same as those of the apparatus for detecting the distance of the first aspect can be expected by orthogonally demodulating the signals of reflected waves with the sinusoidal wave signals at a frequency nearly equal to the resonance frequency of the oscillation unit.

According to an apparatus for detecting a distance of a third aspect of the invention; the orthogonal demodulation means produces demodulated signals containing different components of the in-phase components and the orthogonal components for the sinusoidal wave signals included in the reflected wave signals; provision is made of demodulated signal adder means for adding up the demodulated signals containing the in-phase component and the orthogonal component output by the orthogonal demodulation means within a period of time equal to a time of transmission from the start of transmission of the transmission waves until the end thereof; and the distance detecting means detects the distance to the body by using the demodulated signals containing the in-phase component and the orthogonal component added up by the demodulated signal adder means.

By adding up the orthogonally demodulated signals during the period of time equal to the time of transmitting the transmission waves as described above, the SN ratio of the demodulated signals can be improved after the addition. As a result, the distance to the body can be detected by using the demodulated signals having an improved SN ratio.

According to an apparatus for detecting a distance of a fourth aspect of the invention; the orthogonal demodulation means produces demodulated signals containing different components of the in-phase components and the orthogonal components for the sinusoidal wave signals included in the reflected wave signals; provision is made of demodulated signal-obtaining means for obtaining demodulated signals produced by the orthogonal demodulation means at regular intervals; provision is made of demodulated signal subtracter means for calculating a differential vector among the in-phase component obtained in the last time by the demodulated signal-obtaining means, demodulated signal containing the orthogonal component, the in-phase component obtained this time and the demodulated signal containing the orthogonal component for each component; provision is made of demodulated signal adder means for adding up the differential vectors calculated by the demodulated signal subtracter means during a period of time equal to the time of transmission of from the start of transmission of the transmission waves until the end thereof; and the distance detecting means detects the distance to the body using a demodulated signal of the sum of differential vectors added up by the demodulated signal adder means.

When, for example, a body reflecting the transmission waves is in motion, a frequency component of an angular frequency ($\omega_2$) is added to the reflected waves received by the transmitter/receiver means being affected by the Doppler effect. The reflected waves affected by the Doppler effect are orthogonally demodulated by the orthogonal demodulation means, and the demodulated signals are passed through an LPF having a function of the orthogonal demodulation means. Namely, to the output of the LPF of the formula (4) are added a term $e^{j\omega 2t}$ and a rotational vector $e^{j\omega 2}$ on the IQ plane as expressed by the following formula (5), $$\text{LPF output} = A \times f[t] \times e^{j\theta} \times e^{j\omega 2t} \quad (5)$$

When the reflecting body is in uniform motion, however, the angular frequency ($\omega_2$) assumes a constant value, and the above formula (5) can be rewritten as the following formula (6), $$\text{LPF output} = A \times f[t] \times e^{j\theta} \times e^{j\omega 2t} = A \times f[t] \times e^{j\theta} \times e^{j\theta(t)} \quad (6)$$

Here, a difference between the output signal produced last time by the LPF and the output produced this time obtained through the demodulation signal subtracter means can be expressed by the following formula (7), $$\text{Difference detected} = A1 \times f[t] \times e^{j\theta} \times e^{j\theta[t]} / \{A2 \times f[t] \times e^{j\theta} \times e^{j\theta[t+1]}\} = A3 \times e^{j\{\theta[t]-\theta[t+1]\}} = A3 \times e^{j\theta 2} \quad (7)$$

As described above, the demodulated signal having the differential produces a vector (differential vector) in a direction of the phase ($\theta 2$) on the IQ plane. By adding a vector to the differential vector by the demodulated signal adder means, therefore, the SN ratio of the demodulated signal can be improved even when the reflecting body is in uniform motion.

According to an apparatus for detecting a distance of a fifth aspect of the invention, the demodulated signal adder means adds up the demodulated signals containing the in-phase component and the orthogonal component produced by the orthogonal demodulator means, or adds up the differential vectors calculated by the demodulated signal subtracter means.

When the processing is not executed for adding up the differential vectors by the apparatus for detecting a distance of the fourth aspect or when the processing is executed for adding up the differential vectors, a vector is not produced in a predetermined direction on the IQ plane but turns on the IQ plane when the reflecting body is accelerating. By adding up the vectors for a period of time shorter than the transmission time, therefore, the direction of the vectors can be suppressed to lie in a predetermined range and, hence, the SN ratio of the demodulated signal can be improved to some extent.

According to an apparatus for detecting a distance of a sixth aspect of the invention, provision is made of transmission time varying means for varying the time for transmission, and the demodulated signal adder means adds up the demodulated signals containing the in-phase component and the orthogonal component produced by the orthogonal demodulation means or adds up the differential vectors calculated by the demodulated signal subtracter means for a period of time equal to, or shorter than, the transmission time varied by the transmission time varying means. This makes it possible to add the vectors for a period of time based on the transmission time that is varied.

According to an apparatus for detecting a distance according to a seventh aspect; the transmitter/receiver means transmits the transmission waves and receives the reflected waves repetitively being switched over at regular intervals; provision is made of storage means for storing the demodulated signals added up by the demodulated signal adder means for each cycle in which the transmitter/receiver means transmits the transmission waves and receives the reflected waves thereof; provision is made of demodulated signal averaging means for averaging the demodulated signals of an amount of a plurality of cycles stored by the storage means; and the distance detecting means detects the distance to the body by using the demodulated signals averaged by the demodulated signal averaging means. This stabilizes the detection of the distance.

According to an apparatus for detecting a distance according to an eighth aspect, the distance detecting means detects the distance to the body based on a time difference between a time for starting the transmission of transmission waves and a time when a signal level of the demodulated signal becomes greater than a predetermined level. This makes it possible to detect the distance to the body by using the demodulated signal having an improved SN ratio, to decrease the signal level of the demodulated signal and, hence, to lower the consumption of electric power and to lengthen the distance to the body that can be detected.

An apparatus for detecting a body according to a ninth aspect comprises: transmission signal-generating means for generating transmission signals; modulation means for producing modulated signals by modulating the transmission signals generated by the transmission signal-generating means; transmitter/receiver means for transmitting the modulated signals produced by the modulation means as transmission waves and for receiving the reflected waves thereof; pulse compressing means for finding a correlation between the signals of reflected waves received by the transmitter/receiver means and the modulated signals, and for compressing the received signals; and body detecting means for detecting a body based on the transmitted signals and the received signals that are compressed; wherein, in finding a correlation, the pulse compressing means multiplies the received signals by a conjugated complex signal of the modulated signals a plurality of number of times at timings that differ in time relative to the received signals, operates a differential vector between the multiplied result and the preceding multiplied result for each unit of modulation, adds up the calculated differential vectors for each unit of modulation, and averages the added results to find the correlation.

As described above, there has been known a pulse compressing method by which the modulated signals obtained by modulating the frequency or the phase of the pulse signals are transmitted, the reflected waves thereof are received, and a correlation (self-correlation) to the modulated signals is obtained to compress the pulse widths of the received signals.

The pulse compressing method is based on a prerequisite of being used for detecting a static body (which is not moving), and is not capable of favorably compressing the signals of the waves reflected by a body which is in uniform motion. This is because when the body is moving uniformly, the frequency of the signals of the reflected waves is shifted being affected by the Doppler effect. In compressing the pulses, therefore, a correlation is not maintained relative to the modulated signals and, hence, the pulse widths of the received signals are not favorably compressed.

In view of this problem, in finding a correlation relative to the demodulated signals, the received signals are multiplied by a conjugated complex signal of the modulated signals a plurality of number of times at timings that differ in time with respect to the received signals, and a differential vector between the multiplied result and the preceding multiplied result is calculated for each unit of modulation. Thus, a differential vector from the preceding multiplied result is found to offset the shifting amount in the frequency of the received signals caused by the Doppler effect when a body is in uniform motion.

Therefore, the differential vectors from which the shifting amount of frequency is offset are added up, and the added results are averaged to find a correlation to the modified signals. Even when the body is in uniform motion, therefore, the pulses can be favorably compressed as in the case of detecting the static body. As a result, the SN ratio of the received signals can be improved at the time of detecting the body that is in uniform motion.

In calculating the differential vector according to a tenth aspect, the differential vector is calculated from the multiplied result and from the preceding multiplied result to more correctly offset the shifting amount in the frequency of the received signals caused by the Doppler effect.

According to an apparatus for detecting a body of an eleventh aspect, the modulation means produces modulated signals by modulating at least any one of the amplitude, frequency or phase of the transmission signals. This makes it possible to modulate the amplitude, frequency or phase of the transmission signals.

An apparatus for detecting a body according to a twelfth aspect comprises: transmission signal-generating means for generating transmission signals constituted by a plurality of pulse trains consisting of a plurality of pulses; modulation means for producing modulated signals by digitally modulating at least one of the amplitude, frequency or phase of the transmission signals generated by the transmission signal-generating means according to a sign train constituted by a combination of a plurality of signs for each pulse train of the transmission signals; transmitter/receiver means for transmitting the modulated signals produced by the modulation means as transmission waves and for receiving the reflected waves thereof; pulse compressing means for finding a correlation between the signs of received signals of reflected waves received by the transmitter/receiver means and the signs of the modulated signals, and for compressing the received signals; and body detecting means for detecting a body based on the transmitted signals and the received signals that are compressed.

This invention improves the SN ratio of the received signals by transmitting the transmission signals that have been digitally modified, and compressing the received signals of the reflected waves. When, for example, the transmission signal-generating means generates the pulse signals (f[t]) of the angular frequency ($\omega$) as transmission signals and transmits the transmission signals while digitally modulating the phases thereof, the fundamental component of the transmission waves is expressed by the following formula (8), Transmission waves=$f[t] \times \cos(\omega t+\theta[t])$ (8)

where $\theta[t]$ is a function representing a phase modulation component.

If the received signals of reflection waves having a frequency component nearly equal to the transmission waves are orthogonally demodulated by using sinusoidal wave signals of an angular frequency ($\omega_1 t+\theta 2$) and are separated into the in-phase component and the orthogonal component of the demodulated signals, the demodulated signals become as expressed by the following formula (9), Demodulated signals=$f[t] \times \cos(\omega t+\theta[t]) \times \cos(\omega_1 t+\theta 2)+j\{f[t] \times \cos(\omega t+\theta[t]) \times -\sin(\omega_1 t+\theta 2)\}=(\frac{1}{2}) \times f[t] \times \{\cos(\omega t+\theta[t]+\omega_1 t+\theta 2)+\cos(\omega t+\theta[t]-\omega_1 t-\theta 2)\}-(\frac{1}{2}) \times j\{\sin(\omega t+\theta[t]+\omega_1 t+\theta 2)+\sin(-\omega t-\theta[t]+\omega_1 t+\theta 2)\}$ (9)

wherein $\theta 2$ is a phase difference produced when the transmission wave propagates through a passage along which it is reflected by the body to be detected and is received.

When the orthogonal demodulation is effected with the sinusoidal wave signals of the angular frequency ($\omega_1=\omega$) in synchronism with the angular frequency ($\omega$) of pulse signals (f[t]), the demodulated signals are expressed by the following formula (10), Demodulated signals=$(\frac{1}{2}) \times f[t] \times \{\cos(\omega t+\theta[t]+\omega t+\theta 2)+\cos(\omega t+\theta[t]-\omega t-\theta 2)\}-(\frac{1}{2}) \times j\{\sin(\omega t+\theta[t]+\omega t+\theta 2)+\sin(-\omega t-\theta[t]+\omega t+\theta 2)\}=(\frac{1}{2}) \times f[t] \times \{\cos(2\omega t+\theta[t]+\theta 2)+\cos(\theta[t]-\theta 2)\}-(\frac{1}{2}) \times j\{\sin(2\omega t+\theta[t]+\theta 2)+\sin(-\theta[t]+\theta 2)\}$ (10)

If the component of a frequency twice as great as the angular frequency ($\omega$) is removed from demodulated signals expressed by the above formula (10) by using a low-pass filter (LPF) having a function of the orthogonal demodulation means, the output from the LPF is expressed by the following formula (11), $$LPF \text{ output} = (1/2) \times f[t] \times +\cos(\theta[t] - \theta 2) + j(1/2) \times \sin(\theta[t] - \theta 2)$$
$$= A \times f[t] \times e^{j(\theta[t]-\theta 2)} \quad (11)$$

where A is a constant.

As described above, the orthogonal demodulation is effected by using sinusoidal wave signals of an angular frequency in synchronism with the angular frequency ($\omega$) of pulse signals f[t], and the component of a frequency twice as high contained in the demodulated signals is removed therefrom to pick up the amplitude (A) component and the phase component ($\theta[t]-\theta 2$) of the received signals. The method of picking up the amplitude component and the phase component of the received signals is not limited to the one of the above orthogonal demodulation.

Here, in order to find a correlation between the received signal output from the LPF and the demodulated signal, the received signals are multiplied by a conjugated complex signal corresponding to a conjugated complex number of the modulated signals a plurality of number of times at timings that differ in time relative to the received signals, and the multiplied results are added up, and the added results are averaged according to the following formula (12), $(1/N) \times \Sigma\{A \times f[t] \times e^{j(\theta[t]-\theta 2)} \times e^{-j\theta[t]}\}=(1/N) \times \Sigma\{A \times f[t] \times e^{-j\theta 2}\}$ (12)

wherein (N) is a number of signs of the sign train (unit of modulation).

If the calculated result of the above formula 12 is shown on a complex plane (IQ plane) comprising the in-phase component (I) and the orthogonal component (Q), there is obtained a vector in a predetermined direction (a point on the IQ plane) as shown in FIG. 13C in a section of transmitting the transmission signals in FIG. 13A. By adding and averaging the multiplied results, further, there is obtained a vector of a magnitude proportional to the number of times of addition. As for the noise contained in the received signals, on the other hand, there is no correlation between the noise signals that are received and the modulated signals even when there are received waves of a frequency nearly equal to the transmission waves. As shown in FIG. 13D, therefore, the noise signals become random on the IQ plane, and the vectors thereof are small.

FIG. 11 illustrates a functional constitution of a correlation filter for finding a correlation between the received signals output from the LPF and the modulated signals. The correlation filter is for obtaining a correlation of signs between the received signals and the modulated signals, and its function is the same as the one for executing the calculation processing of the above formula (12). That is, the correlation filter multiplies the sign of the received signals by a sign corresponding to a conjugated complex signal of the modulated signal a plurality of number of times at timings that differ in time relative to the received signal, adds up the multiplied results, and averages the added results to find a correlated value. By finding the correlated value by using the correlation filter as described above, a difference can be distinguished between a peak in the correlated value representing the degree of correlation and the correlated value other than the peak (i.e., side lobe).

By transmitting the modulated signals obtained by digitally modulating the sign of the transmission signals as transmission waves and compressing the received signals of the reflected waves thereof by using the sign, the SN ratio of the received signals can be improved.

According to an apparatus for detecting a body according to a thirteenth aspect, the pulse compression means, in finding a correlation, multiplies the sign of the received signals by a conjugated complex sign of the demodulated signals a plurality of number of times at timings that differ in time relative to the received signals, operates a differential vector between the multiplied result and the preceding multiplied result for each sign, adds up the differential vectors calculated for each sign, and averages the added results to find a correlation.

When the received signals of waves reflected, for example, by a body that is in uniform motion are to be compressed as described above, the frequency of the received signals of the reflected waves is shifted being affected by the Doppler effect, and a result is obtained as expressed by the following formula (13), $$(1/N) \times \Sigma \{A \times f[t] \times e^{-j\theta 2} \times e^{j\Delta\theta[t]}\} \quad (13)$$

wherein $\Delta\theta[t]$ is a function representing a change in the phase due to the Doppler shift.

This means, as illustrated in FIG. 15A, that when the waves are received for a period of time corresponding to a section for transmitting the transmission signals, the amount of phase change due to the Doppler shift is added in the step of compressing the pulses whence the vector of the received signal turns on the IQ plane making it difficult to favorably compress the pulse width of the received signals.

In order to find a correlation between the received signals of waves reflected by the body which is in uniform motion and the modulated signals as represented by the following formula (14), therefore, the sign of the received signals is multiplied by a sign corresponding to a conjugated complex signal of the modulated signal a plurality of number of times at timings that differ in time relative to the received signal, a differential vector between the multiplied result and the preceding multiplied result is calculated for each sign, the differential vectors calculated for each sign are added up, and the added results are averaged, $$(1/N) \times \Sigma \{A \times f[t] \times e^{-j\theta 2} \times e^{j\Delta\theta[t-1]}\} \times \{A \times f[t] \times e^{-(-j\theta 2)} \times e^{-j\Delta\theta[t]}\} = (1/N) \times \Sigma \{A^2 \times f^2[t] \times e^{j\Delta\theta}\} \quad (14)$$

If the result calculated according to the above formula (14) is shown on the IQ plane as shown in FIG. 15B, a predetermined phase difference ($\theta 2$) is exhibited in a section of transmitting the transmission signals in FIG. 13A, i.e., a vector is exhibited having a magnitude proportional to the number of times of addition.

FIG. 12 illustrates a functional constitution of a correlation filter for finding a correlation between the received signals and the modulated signals relying on the difference in the vector. The differential correlation filter is for obtaining a correlation of signs between the received signals and the modulated signals, and has a function of executing the calculation processing of the above formula 14. That is, the differential correlation filter multiplies the sign of the received signals by a conjugated complex sign of the modulated signal a plurality of number of times at timings that differ in time relative to the received signals, calculates a differential vector between the multiplied result and the preceding multiplied result for each sign, adds up the differential vectors calculated for each sign, and averages the added results to find a correlated value.

As described above, the differential correlation filter finds a correlated value by using differential vectors to distinguish a difference between a peak of correlated value representing the degree of correlation and a correlated value other than the peak (i.e., side lobe). As a result, the SN ratio of the received signals is improved.

Even by receiving signals of the waves reflected by the static body, a result is obtained as calculated according to the following formula (15) by finding a correlated value by the differential correlation filter using the differential vectors, $$(1/N) \times \Sigma \{A \times f[t] \times e^{-j\theta 2}\} \rightarrow (1/N) \times \Sigma \{A \times f[t] \times e^{-j\theta 2}\} \times \{A \times f[t] \times e^{-(-j\theta 2)}\} = (1/N) \times \Sigma \{A^2 \times f^2[t] \times e^{j0}\} = A^2 \times f^2[t] \quad (15)$$

If the result calculated according to the above formula 15 is shown on the IQ plane, there is obtained, on the IQ plane, a vector representing a point on the I-axis as shown in FIG. 14. Even when a static body is detected, therefore, the SN ratio of the received signals can be improved.

In calculating the differential vector according to a fourteenth aspect, the differential vector is calculated from the multiplied result and from the preceding multiplied result to more correctly offset the shifting amount in the frequency of the received signals caused by the Doppler effect.

According to an apparatus for detecting a body of a fifteenth aspect, the pulse compression means includes a phase detecting means for detecting the phase of the differential vector, and the body detecting means detects a speed relative to the body based on the phase detected by the phase detecting means.

Conventionally, for example, when speed relative to the body and change in distance to the body are detected by using an ultrasonic sonar, the waves reflected by the body are received at least twice, and the data are detected from a difference in the time of the received signals. According to the fifteenth aspect, a feature resides in that the reflected waves are received one time to detect the speed relative to the body and the change in the distance to the body.

That is, the time required for the phase of the differential vector to turn once (360 degrees) on the IQ plane is found from the phase ($\Delta\theta$) of the differential vector and from the rate of modulating the transmission signals by the modulation means. Therefore, the frequency ($\Delta f$) of the Doppler shift amount is found from an inverse number of the time. The thus found frequency ($\Delta f$) of the amount of Doppler shift is applied to the next formula to obtain a relative speed (V) of the reflecting body. In the following formula (16), C denotes the speed of sound (speed of light when the transmission waves are electromagnetic waves) and fp denotes a frequency of the transmission signals, $$V = \Delta fp \times C/F \tag{16}$$

As described above, the waves reflected by the body are not received a plurality of number of times but are received only once to detect the speed relative to the body from the phase of the differential vector of the received signals. Referring to FIG. 15B, it is allowed to detect whether the body is approaching or is moving away (to detect a change in the distance to the body) from the direction in which the differential vector is turning on the IQ plane.

According to an apparatus for detecting a body according to a sixteenth aspect, the pulse compression means includes a phase detecting means for detecting the phase of the differential vector, and the body detecting means detects an acceleration or a deceleration of the body based on a phase difference between at least two differential vectors detected by the phase detecting means.

As described above, the speed relative to the body is detected from the phase of the differential vector making it possible to detect the acceleration or the deceleration of the reflecting body relying upon the phase difference between at least two differential vectors and upon the rate of modulation.

According to an apparatus for detecting a body of a seventeenth aspect, the transmitter/receiver means includes a resonance type microphone which drives a piezoelectric element to resonate accompanying the drive thereof, and the modulation means produces modulated signals by modulating the phase of the transmission signals to drive the piezoelectric element. This makes it possible to modulate the phase of the transmission waves transmitted from the resonance type microphone.

According to an apparatus for detecting a body of an eighteenth aspect, the transmission signal-generating means includes control means for controlling the duration of time for continuously generating the transmission signals based upon a combination of the oscillating characteristics of the resonance type microphone and the signs constituting the sign train. This makes it possible to control the time for continuously generating the transmission signals.

According to an apparatus for detecting a body according to a nineteenth aspect, when the modulation means is to produce the modulated signals of a pulse train of a sign different from the sign of the preceding pulse train, the control means controls the time duration so as to produce modulated signals of a pulse train of a different sign nearly after the convergence of oscillation of the resonance type microphone oscillated by the modulated signals of the pulse train of the preceding sign. Therefore, the transmission waves having a phase that changes depending upon the sign can be transmitted from the resonance type microphone.

According to an apparatus for detecting a body according to a twentieth aspect, when the modulation means is to produce the modulated signals of a pulse train of a sign different from the sign of the preceding pulse train, the control means controls the duration of time so as to produce modulated signals of a pulse train of a different sign containing pulses of a number greater than the number of pulses of the pulse train of the preceding sign.

Therefore, the modulated signals of a pulse train of a different sign can be produced without waiting for the convergence of oscillation of the resonance type microphone, and the rate of modulation can be heightened. As a result, the time interval of the pulse trains can be shortened, and resolution of distance can be heightened in detecting the distance to the body.

According to an apparatus for detecting a body of a twenty-first aspect, when the modulation means is to produce the modulated signals of a pulse train of a sign same as the sign of the preceding pulse train, the control means controls the time duration so as to produce modulated signals of a pulse train of the same sign containing pulses of a number smaller than the number of pulses of the pulse train of the preceding sign.

In repeating the phase modulation before the amplitude of the waves transmitted from the resonance microphone reaches the saturation point, if, for example, a modulated signal of the sign same as the preceding sign is output, then, the amplitude of the transmission waves increases to become not the same as the amplitude of other sign.

Therefore, when the modulated signals of the same sign as the preceding sign are to be produced, there are produced the modulated signals of a pulse train containing pulses of a number smaller than the number of pulses of the pulse train of the preceding sign. Namely, there are produced modulated signals of a pulse train containing blank portions without producing pulses. This makes it possible to maintain constant the amplitude of the transmission waves.

According to a twenty-second aspect of an apparatus for detecting a body, in producing the modulated signals of a pulse train of a sign different from the sign of the preceding pulse train, the modulation means gradually varies the phases of pulses in the pulse train of the preceding sign prior to producing the modulated signals of the pulse train of a different sign.

Usually, the resonance microphone which resonates accompanying the drive of the piezoelectric element has a low response speed for the phase modulation. By taking the low response speed into consideration, therefore, the phases of pulse in the pulse train of the preceding sign are gradually varied to assume a desired phase before the modulated signals of a pulse train of a different sign are output in producing the modulated signals of a pulse train of a sign different from the pulse train of the preceding sign. Therefore, the resonance microphone transmits the transmission waves of which the phases are modulated at suitable timings.

According to a twenty-third aspect of an apparatus for detecting a body, the pulse compressing means finds a correlated value that represents a degree of correlation between the received signals and the modulated signals, and the modulation means uses a sign train constituted by signs of a combination of which the side lobe level of a correlated value found by the pulse compressing means is not larger than the amount of one sign agreement or of which the side lobe level before the peak of the correlated value is not larger than the amount of one sign agreement.

When the distance to the body is to be detected, for example, the detection is effected by using a time of generating a peak of the correlated value. Therefore, the magnitude of the side lobe level after the peak does not affect the detection of the distance. Namely, the distance can be detected by using a sign train constituted by signs of a combination in which the side lobe level preceding at least the peak of the correlated value is not larger than the amount of one sign agreement.

According to a twenty-fourth aspect of an apparatus for detecting a body, the pulse compressing means finds a correlated value that represents a degree of correlation between the received signals and the modulated signals, and, when a correlated value is to be found as a sign train from the differential vectors calculated by the pulse compressing means, the modulation means uses a sign train constituted by signs of a combination different from the sign train of when the correlated value is to be found without calculating the differential vectors.

FIG. 16A illustrates a combination of signs of a sign train capable of suppressing the side lobe level when a correlated value is found without using differential vectors, which is different from a combination of signs of a sign train which is capable of suppressing the side lobe level when a correlated value is found by using the differential vectors shown in FIG. 16B.

In finding a correlation by using the differential vectors, therefore, there is used a sign train constituted by signs of a combination different from the sign train of the case of when the correlated value is to be found without using the differential vectors, making it possible to suppress the side lobe level of when the correlated value is to be found by using the differential vectors.

A twenty-fifth aspect of an apparatus for detecting a body comprises degree-of-agreement determining means for determining the degree of agreement related to a direction for each differential vector calculated in the pulse compression, and the body detecting means detects the body by using a received signal determined by the degree-of-agreement determining means to have a high degree of agreement concerning the directions of differential vectors.

As described above, the differential vector based on the received signals of the waves reflected by the body in uniform motion has a constant phase ($\Delta\theta$) on the IQ plane in a section for transmitting the transmission signals as shown in FIG. 15B. When the speed of the body is very low, the differential vector becomes the one shown in FIG. 17B representing a point on the I-axis in the section for transmitting the transmission signals. When the received signals contain noise, on the other hand, the differential vectors are a group of differential vectors which are not concentrated at one point on the I-axis as shown in FIG. 17A.

Therefore, a direction of the group of differential vectors on the IQ plane can be used as an index of a degree of reliability of the received signals. By determining the degree of agreement concerning a direction of the group of differential vectors on the IQ plane, therefore, a body can be detected by using the received signals having a high degree of reliability.

According to a twenty-sixth aspect of an apparatus for detecting a body, the degree-of-agreement determining means includes a differential synthetic vector calculation means for calculating a differential synthetic vector obtained by synthesizing the differential vectors, and renders the determination by using any one of the phase of the differential synthetic vector calculated by the differential synthetic vector calculation means, a sign of the in-phase component, or magnitudes of absolute values of the in-phase component and of the orthogonal component.

Thus, whether the received signals have a high degree of reliability can be determined by determining the degree of agreement concerning the direction of each differential vector by using any one of the phase of the differential synthetic vector obtained by synthesizing the group of differential vectors, sign of the in-phase component or the magnitudes of absolute values of the in-phase component and of the orthogonal component.

According to a twenty-seventh aspect of an apparatus for detecting a body, the degree-of-agreement determining means determines that the degree of agreement is high concerning the direction of each differential vector when the sign of the in-phase component of the differential synthetic vector is positive. By determining whether the sign of the in-phase component of the differential synthetic vector is positive, it is allowed to determine whether the differential synthetic vector is the one in a direction of within ±90 degrees. As a result, the degree of agreement can be easily determined.

According to a twenty-eighth aspect of an apparatus for detecting a body, the degree-of-agreement determining means determines that the degree of agreement is high concerning the direction of each differential vector when an absolute value of the in-phase component of the differential synthetic vector is greater than an absolute value of the orthogonal component. By comparing the magnitude of the absolute value of the in-phase component of the differential synthetic vector with the magnitude of the absolute value of the orthogonal component, it is allowed to determine whether the differential synthetic vector is the one in a direction of within ±45 degrees. As a result, there is no need of calculating the phase for each differential vector.

According to a twenty-ninth aspect of an apparatus for detecting a body, the degree-of-agreement determining means determines the degree of agreement concerning the direction of each differential vector based on a number of signs of the differential vectors which are in agreement. It is thus determined whether the received signals have a high degree of reliability based on the signs of the individual differential vectors.

According to a thirtieth aspect of an apparatus for detecting a body, the degree-of-agreement determining means so determines that the degree of agreement is high concerning the direction of each differential vector when the number of differential vectors having a positive sign of the in-phase component is greater than a predetermined number. It is thus allowed to determine the number of differential vectors in a direction of within ±90 degrees based on the number of differential vectors having the positive sign of the in-phase component.

According to a thirty-first aspect of an apparatus for detecting a body, the degree-of-agreement determining means determines that the degree of agreement is high concerning the direction of each differential vector when the number of differential vectors having the absolute value of the in-phase component greater than the absolute value of the orthogonal component is larger than a predetermined number.

By comparing the magnitude of the absolute value of the in-phase component with the magnitude of the absolute value of the orthogonal component of each differential vector, it is possible to determine the number of differential vectors in a direction of within ±45 degrees.

A thirty-second aspect of an apparatus for detecting a body comprises sinusoidal wave-generating means for generating sinusoidal wave signals at a frequency in synchronism with the frequency of the transmission signals or of a frequency nearly equal to the resonance frequency of the resonance type microphone; and orthogonal demodulation means which orthogonally demodulates the received signals of reflected waves received by the transmitter/receiver means by using sinusoidal wave signals generated by the sinusoidal wave-generating means, and produces the in-phase components and the orthogonal components of the demodulated received signals; wherein the pulse compressing means compresses the received signals that are demodulated by the orthogonal demodulation means.

By orthogonally demodulating the received signals by using sinusoidal wave signals at a frequency in synchronism with the frequency of the transmission signals or at a frequency nearly equal to the resonance frequency of the resonance type microphone, received signals having an improved SN ratio can be compressed.

According to a thirty-third aspect of an apparatus for detecting a body, when the degree-of-agreement determining means determines that the degree of agreement is high concerning a direction of a plurality of differential vectors and, besides, when the amplitudes of the received signals are greater than a predetermined level, the body detecting means detects the body by using the received signals.

By taking into consideration the amplitude level of the received signals determined to have a high degree of reliability as described above, it is allowed to detect the body by using the received signals having a high degree of reliability.

According to a thirty-fourth aspect, an apparatus for detecting a body includes: transmission signal-generating means for generating transmission signals; modulation means for producing modulated signals by modulating the transmission signals generated by the transmission signal-generating means; transmitter/receiver means for transmitting the modulated signals produced by the modulation means as transmission waves and for receiving the reflected waves thereof; pulse compressing means for finding a correlation between the received signals of reflected waves received by the transmitter/receiver means and the modulated signals, and for compressing the received signals of the reflected waves; and body detecting means for detecting a body based on the transmitted signals and the received signals that are compressed; wherein the pulse compressing means: includes Doppler shift correction means for correcting the Doppler shift in the received signals of the reflected waves by using correction signals for correcting the Doppler shift in the received signals; and finds a correlation between the demodulated signal and the received signal after the Doppler shift has been corrected by the Doppler shift correction means, and compresses the pulses thereof relying upon the result thereof.

As described above, the conventional method of compressing the pulses is based on a prerequisite of being used for detecting a static body (which is not in motion), and is not capable of favorably compressing the received signals of the waves reflected by a body that is in uniform motion.

This is because when a body is in uniform motion, the frequency of the received signals of the reflected waves shifts due to the Doppler effect, and a correlation to the modulated signals is not maintained at the time of compressing the pulses. As a result, the pulse widths of the received signals are not favorably compressed.

The present apparatus was accomplished in view of the above problems, and attempts to improve the SN ratio of the received signals by correcting the Doppler shift in the received signals by using a correction signal for correcting the Doppler shift and by finding a correlation from the modulated signals and the received signals after the Doppler correction.

When, for example, the transmission signal-generating means generates the pulse signals (f[t]) of the angular frequency ($\omega$) as transmission signals and transmits the transmission signals while digitally modulating the phases thereof, the fundamental component of the transmission waves is expressed by the following formula (17), $$\text{Transmission waves} = f[t] \times \cos(\omega t + \theta[t]) \tag{17}$$

where $\theta[t]$ is a function representing a phase modulation component.

If the received signals of reflection waves having a frequency component nearly equal to the transmission waves are orthogonally demodulated by using sinusoidal wave signals at an angular frequency ($\omega_1 t + \theta 2$) and are separated into the in-phase component and the orthogonal component of the demodulated signals, the demodulated signals are as expressed by the following formula (18), $$\begin{aligned}\text{Demodulated signals} &= f[t] \times \cos(\omega t + \theta[t]) \times \cos(\omega_1 t + \theta 2) + j\{f[t] \times \cos(\omega t + \theta[t]) \times -\sin(\omega_1 t + \theta 2)\} = (\tfrac{1}{2}) \times f[t] \times \{\cos(\omega t + \theta[t] - \omega_1 t + \theta 2) + \cos(\omega t + \theta[t] - \omega_1 t - \theta 2)\} - (\tfrac{1}{2}) \times j \{\sin(\omega t + \theta[t] + \omega_1 t + \theta 2) + \sin(-\omega t - \theta[t] + \omega_1 t + \theta 2)\}\end{aligned} \tag{18}$$

where $\theta 2$ is a phase difference produced when the transmission wave propagates through a passage along which it is reflected by the body to be detected and is received.

When the orthogonal demodulation is effected with the sinusoidal wave signals of the angular frequency ($\omega_1 = \omega$) in synchronism with the angular frequency ($\omega$) of pulse signals (f[t]), the demodulated signals are expressed by the following formula (19), $$\begin{aligned}\text{Demodulated signals} &= (\tfrac{1}{2}) \times f[t] \times \{\cos(\omega t + \theta[t] + \omega t + \theta 2) + \cos(\omega t + \theta[t] - \omega t - \theta 2)\} - (\tfrac{1}{2}) \times j\{\sin(\omega t + \theta[t] + \omega t + \theta 2) + \sin(-\omega t - \theta[t] + \omega t + \theta 2)\} = (\tfrac{1}{2}) \times f[t] \times \{\cos(2\omega t + \theta[t] + \theta 2) + \cos(\theta[t] - \theta 2)\} - (\tfrac{1}{2}) \times j\{\sin(2\omega t + \theta[t] + \theta 2) + \sin(-\theta[t] + \theta 2)\}\end{aligned} \tag{19}$$

If the component of a frequency twice as great as the angular frequency ($\omega$) is removed from demodulated signals expressed by the above formula (19) by using a low-pass filter (LPF) having a function of the orthogonal demodulation means, the output from the LPF is expressed by the following formula (20), $$\text{LPF output} = (\tfrac{1}{2}) \times f[t] \times + \cos(\theta[t] - \theta 2) + j(\tfrac{1}{2}) \times \sin(\theta[t] - \theta 2) = A \times f\{t\} \times e^{j(\theta[t] - \theta 2)} \tag{20}$$

where A is a constant.

As described above, the orthogonal demodulation is effected by using sinusoidal wave signals of an angular frequency in synchronism with the angular frequency ($\omega$) of pulse signals f[t] and the component of a frequency twice as high contained in the demodulated signals is removed therefrom to pick up the amplitude (A) component and the phase component ($\theta[t] - \theta 2$) of the received signals. The method of picking up the amplitude component and the phase component of the received signals is not limited to the one of the above orthogonal demodulation.

Here, in order to find a correlation between the received signal that has not been affected by the Doppler effect and the demodulated signal, the received signal is multiplied by a conjugated complex signal corresponding to a conjugated complex number of the modulated signal a plurality of number of times at timings that differ in time relative to the received signal, and the multiplied results are added up, and the added results are averaged according to the following formula (21), $$(1/N) \times \Sigma \{A \times f[t] \times e^{j(\theta[t] - \theta 2)} \times e^{-j\theta[t]}\} = (1/N) \times \Sigma \{A \times f[t] \times e^{-j\theta 2}\} \tag{21}$$

wherein (N) is a number of signs of the sign train (unit of modulation).

If the calculated result of the above formula 21 is shown on a complex plane (IQ plane) comprising the in-phase component (I) and the orthogonal component (Q), there is obtained a vector in a predetermined direction (a point on the IQ plane) in a section of transmitting the transmission signal. By adding and averaging the multiplied results, further, there is obtained a vector of a magnitude proportional to the number of times of addition. As for the noise contained in the received signals, on the other hand, there is no correlation between the noise signals that are received and the modulated signals even when there are received waves of a frequency nearly equal to the transmission waves. Therefore, the noise becomes random on the IQ plane, and the vector thereof is small.

However, when the received signals of waves reflected, for example, by a body that is in uniform motion are to be compressed, the frequency of the received signals of the reflected waves is shifted being affected by the Doppler effect, and a result is obtained as expressed by the following formula (22), $$(1/N) \times \Sigma \{A \times f[t] \times e^{-j\theta 2} \times e^{j\Delta\theta[t]}\} \quad (22)$$

wherein $\Delta\theta[t]$ is a function representing a change in the phase due to the Doppler shift.

This means that when the waves are received for a period of time corresponding to a section for transmitting the transmission signals, the amount of phase change due to the Doppler shift is added in the step of compressing the pulses whence the vector of the received signal turns on the IQ plane, thereby making it difficult to favorably compress the pulse width of the received signals.

Therefore, in a finding a correlation between the received signals affected by the Doppler effect and the modulated signals, the Doppler shift of the received signals is corrected by using correction signals for correcting the Doppler shift in the received signals, a correlation is found from the received signals that are corrected and the demodulated signals, and the received signals are compressed relying upon the result thereof. In the following formula (23), $(e^{-j\Delta\theta[t]})$ corresponds to the above correction signal (correction term).

$$(1/N) \times \Sigma (\{A \times f[t] \times e^{-j\theta 2} \times e^{j\Delta\theta[t-1]}\} \times \{e^{-j\Delta\theta[t]}\}) = (1/N) \times \Sigma \{A \times f[t] \times e^{-j\theta 2}\} \quad (23)$$

From the result calculated according to the above formula (23), it will be learned that the frequency of the amount of Doppler shift in the received signals has been removed. If the calculated result is shown on the IQ plane, there is obtained a predetermined phase difference ($\theta 2$) in the section for transmitting the transmission signals, i.e., a vector representing a point on the IQ plane. By adding and averaging the multiplied results, further, there is obtained a vector of a magnitude proportional to the number of times of addition.

The correlation detection DS correction filters 212b and 212c in FIG. 19 represent the pulse compression means equipped with the Doppler shift correction means of the invention. That is, the correlation detection DS correction filters 212b and 212c multiply the received signal by a conjugated complex signal of the modulated signal a plurality of number of times at timings that differ in time relative to the received signals, adds up the multiplied results and averages the added results to find a correlation. Here, the correlation detection DS correction filters 212b and 212c correct the Doppler shift in the received signals of the reflected waves in a step preceding the addition of the multiplied results. Therefore, the change in phase due to the Doppler shift is not added, and the vector of the received signals does not turn on the IQ plane.

Therefore, even when the frequency of the received signals is shifted due to the Doppler effect, a difference can be distinguished between a peak of the correlated value representing the degree of correlation and a correlated value other than the peak (i.e., side lobe). As a result, the SN ratio of the received signals can be improved.

According to a thirty-fifth aspect of an apparatus for detecting a body, the Doppler shift correction means includes a correction signal varying means for varying the frequency of the correction signals, and effects the correction by using correction signals varied by the correction signal varying means.

When, for example, the body to be detected is a static body in a thirty-sixth aspect, the frequency of the Doppler shifting amount is calculated from the moving speed of the moving body, the frequency of the correction signals ($e^{-j\Delta\theta[t]}$) is varied depending upon the calculated frequency, and the correction is effected by using the correction signals that are varied. This improves the SN ratio of the received signals of waves reflected by the static body.

Here, it is also allowable to transmit the transmission waves once, detect the phase shift ($\Delta\theta$) due to the Doppler shift from the received signals of the reflected waves, calculate the frequency of the correction signals ($e^{-j\Delta\theta[t]}$) for correcting the Doppler shift, and change the frequency into the thus calculated frequency.

According to a thirty-seventh aspect of an apparatus for detecting a body, provision is made of a plurality of pulse compressing means having different frequencies of correction signals in the Doppler shift correction means, and the body detecting means detects the body based on the received signals from the plurality of pulse compressing means.

When the use of the device for detecting a body of the invention has been specified, it is allowed to estimate in advance the range of speed relative to the body to be detected. Therefore, there are provided a plurality of pulse compressing means to cover a frequency band of Doppler shift depending upon the range of the relative speed that can be estimated, and the body is detected based on the received signals that establish the highest correlation among the received signals from the plurality of pulse compressing means. This makes it possible to properly correct the Doppler shift in the range of relative speed that can be estimated.

According to a thirty-eighth aspect of an apparatus for detecting a body, the Doppler shift correction means in the plurality of pulse compressing means effects the correction by using correction signals for correcting the Doppler shift in the received signals of reflected waves when the position of the body to be detected is approaching.

When the apparatus for detecting a body is mounted, for example, on a moving body, the body separating away from the above moving body is, generally, unlikely to collide. Therefore, there is no need of detecting the body that is moving away. The Doppler correction means in the plurality of pulse compressing means effects the correction by using correction signals for correcting the Doppler shift in the received signals of reflected waves when the position of the body is approaching, making it possible to reduce the constitution of the apparatus.

According to a thirty-ninth aspect of an apparatus for detecting a body, the body detecting means detects at least either a change in the speed relative to the body or a change in the positional relationship to the body based on the received signals compressed by the plurality of pulse compressing means.

When the use of the apparatus for detecting a body of the invention has been specified as described above, the range of speed relative to the body to be detected can be estimated in advance. By providing a plurality of pulse compressing means to cover a frequency band of Doppler shift depending upon the range of the relative speed that can be estimated and by specifying the pulse compressing means that produces the received signals establishing the highest correlation, it becomes possible to detect the speed relative to the body and a change in the positional relationship to the body (approaching/separating away).

According to a fortieth aspect of an apparatus for detecting a body, the plurality of pulse compressing means find a correlated value that represents a degree of correlation between the received signals after the Doppler correction and the modulated signals, compress the received signals relying on the correlated value, and the body detecting means adds up the received signals compressed by the plurality of pulse compressing means, executes the threshold value determination to determine the magnitude of amplitude of the received signals that are added up relative to a preset level of amplitude to detect the body based on the result of determination.

Therefore, the body can be detected without determining the threshold values for the received signals compressed by the plurality of pulse compressing means, making it possible to reduce the processing. In a forty-first aspect, the threshold value determination is effected to determine the amplitudes of the received signals compressed by the plurality of pulse compressing means relative to a preset amplitude level, and the body is detected based on the determined result. This makes it possible to effect the threshold value determination for the received signals.

The amplitude level (threshold value) used for the threshold value determination is set for each of the pulse compressing means (or, in other words, is set for each of the received signals from the pulse compressing means), and the body detecting means determines the threshold values by using amplitude levels corresponding to the received signals.

According to a forty-second aspect of an apparatus for detecting a body, the transmission signal-generating means generates transmission signals constituted by a plurality of pulse trains of a plurality of pulses, the demodulation means produces demodulated signals by digitally demodulating at least any one of the amplitude, frequency or phase of the transmission signals generated by the transmission signal-generating means for each pulse train of the transmission signals according to a sign train constituted by a combination of a plurality of signs, and the pulse compressing means finds a correlation between the signs of the received signals of reflected waves received by the transmitter/receiver means and of the demodulated signals. Thus, a correlation is found from the sign of the received signals and the sign of the demodulated signals.

According to a forty-third aspect of an apparatus for detecting a body, the transmitter/receiver means includes a resonance type microphone which drives a piezoelectric element to resonate accompanying the drive thereof, and the modulation means produces modulated signals obtained by modulating the phase of the transmission signals to drive the piezoelectric element. This makes it possible to modulate the phase of the transmission waves transmitted from the resonance type microphone.

According to a forty-fourth aspect of an apparatus for detecting a body, the transmission signal-generating means includes control means for controlling the time duration for continuously generating the transmission signals based upon a combination of the oscillating characteristics of the resonance type microphone and the signs constituting the sign train. This makes it possible to control the time for continuously generating the transmission signals.

According to a forty-fifth aspect of an apparatus for detecting a body, when the modulation means is to produce the modulated signals of a pulse train of a sign different from the sign of the preceding pulse train, the control means controls the time duration so as to produce the modulated signals of a pulse train of a different sign nearly after the convergence of oscillation of the resonance type microphone oscillated by the modulated signals of the pulse train of the preceding sign. Therefore, the transmission waves having a phase that changes depending upon the sign can be transmitted from the resonance type microphone.

According to a forty-sixth aspect of an apparatus for detecting a body, when the modulation means is to produce the modulated signals of a pulse train of a sign different from the sign of the preceding pulse train, the control means controls the time duration so as to produce the modulated signals of a pulse train of a different sign containing pulses of a number greater than the number of pulses of the pulse train of the preceding sign.

Therefore, the modulated signals of a pulse train of a different sign can be produced without waiting for the convergence of oscillation of the resonance type microphone, and the rate of modulation can be heightened. As a result, the time interval of the pulse trains can be shortened, and resolution of distance can be heightened in detecting the distance to the body.

According to a forty-seventh aspect of an apparatus for detecting a body, when the modulation means is to produce the modulated signals of a pulse train of a sign same as the sign of the preceding pulse train, the control means controls the time duration so as to produce the modulated signals of a pulse train of the same sign containing pulses of a number smaller than the number of pulses of the pulse train of the preceding sign.

In repeating the phase modulation before the amplitude of the waves transmitted from the resonance microphone reaches the saturation point, if, for example, a modulation signal of the sign same as the preceding sign is output, then, the amplitude of the transmission waves increases to become not the same as the amplitude of the other sign.

Therefore, when the modulated signals of the same sign as the preceding sign are to be produced, there are produced the modulated signals of a pulse train containing pulses of a number smaller than the number of pulses of the pulse train of the preceding sign. Namely, there are produced modulated signals of a pulse train containing blank portions without producing pulses. This makes it possible to maintain constant the amplitude of the transmission waves.

According to a forty-eighth aspect of an apparatus for detecting a body, in producing the modulated signals of a pulse train of a sign different from the sign of the preceding pulse train, the modulation means gradually varies the phases of pulses in the pulse train of the preceding sign prior to producing the modulated signals of a pulse train of a different sign.

Usually, the resonance microphone which resonates accompanying the drive of the piezoelectric element has a low response speed for the phase modulation. By taking the low response speed into consideration, therefore, the phases of pulses in the pulse train of the preceding sign are gradually varied to assume a desired phase before the modulated signals of a pulse train of a different sign are output in producing the modulated signals of a pulse train of a sign different from the pulse train of the preceding sign. Therefore, the resonance microphone transmits the transmission waves of which the phases are modulated at suitable timings.

An apparatus for detecting a body according to a forty-ninth aspect of comprises sinusoidal wave-generating means for generating sinusoidal wave signals of a frequency in synchronism with the frequency of the transmission signals or of a frequency nearly equal to the resonance frequency of the resonance type microphone; and orthogonal demodulation means which orthogonally demodulates the received signals of reflected waves received by the transmitter/receiver means by using sinusoidal wave signals generated by the sinusoidal wave-generating means, and produces the in-phase components and the orthogonal components of the received signals that are demodulated; wherein the pulse compression means compresses the received signals that are demodulated by the orthogonal demodulation means.

By orthogonally demodulating the received signals by using sinusoidal wave signals of a frequency in synchronism with the frequency of the transmission signals or of a frequency nearly equal to the resonance frequency of the resonance type microphone, the received signals having an improved SN ratio can be compressed.

According to a fiftieth aspect of an apparatus for detecting a body, at least either the transmission signal-generating means or the modulation means is capable of varying at least any one of the number of signs constituting a sign train, the number of pulse trains constituting the transmission signals or the number of pulses of the pulse trains depending upon the distance to the body to be detected.

By varying at least any one of the number of signs constituting a sign train, number of pulse trains constituting the transmission signals or number of pulses of the pulse train, the transmission waves are not overlapped on the reflected waves in the transmitter/receiver means when the waves are transmitted and received repetitively by the transmitter/receiver means.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

An apparatus for detecting a distance and an apparatus for detecting a body will now be described with reference to the drawings. This embodiment deals with a case where the apparatus for detecting a distance and the apparatus for detecting a body of the invention are mounted on a vehicle such as an automobile to detect the distance to a body such as an obstacle surrounding the vehicle.

First Embodiment

Figure 1:
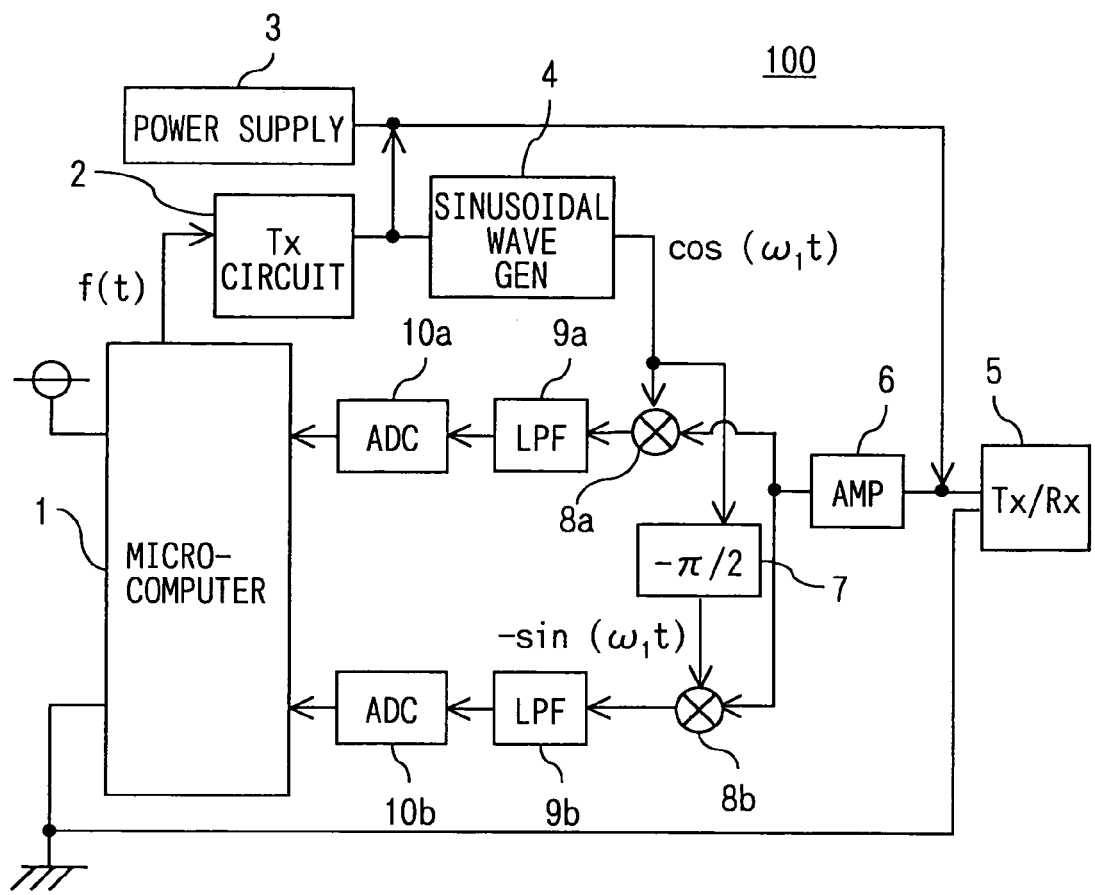
FIG. 1 is a diagram schematically illustrating the constitution of an apparatus for detecting a distance according to a first embodiment.

FIG. 1 is a diagram illustrating the constitution of an apparatus for detecting a distance according to this embodiment. As shown, an apparatus 100 for detecting a distance of the embodiment is constituted by a microcomputer 1, a transmitter circuit 2 (shown as Tx CIR), a power supply device 3, a sinusoidal wave generator 4, a transmitter/receiver microphone 5 (Tx/Rx MIC), an amplifier 6 (AMP), a phase shifter 7, multipliers 8a and 8b, LPFs (low-pass filters) 9a and 9b, and analog/digital converters 10a and 10b (ADCs).

Figure 3:
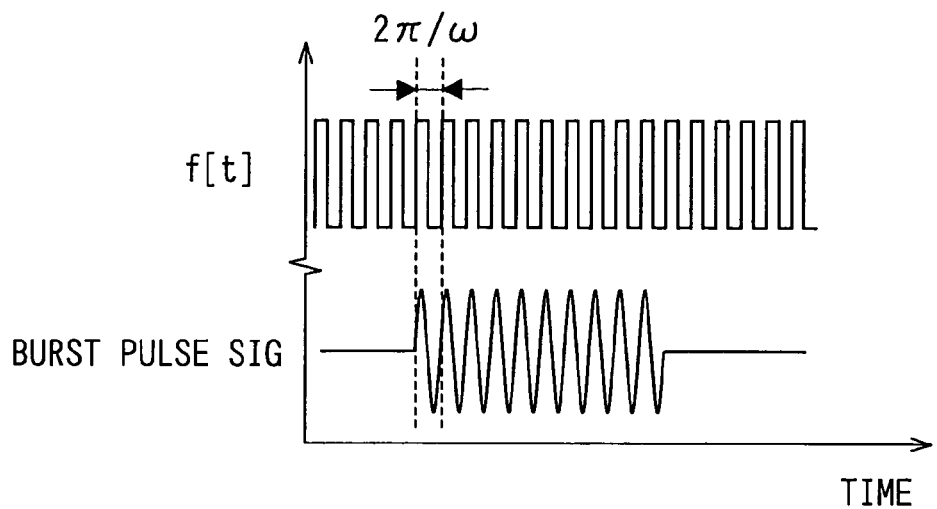
FIG. 3 is an image diagram illustrating pulse signals f[t] generated by a microcomputer and burst pulse signals transmitted from a transmitter circuit 2 according to the first embodiment.

The microcomputer 1 may be a conventional microcomputer constituted by a ROM, a RAM, a CPU, an I/O and a bus for connecting them (not shown for ease of illustration). Referring to FIG. 3, the microcomputer 1 forms pulse signals f[t] having an angular frequency ($\omega$) and sends them to the transmitter circuit 2. The microcomputer 1, further, receives output signals from the ADCs 10a and 10b, and executes a predetermined signal processing for the output signals that are received.

The transmission circuit 2 forms burst pulse signals from the pulse signals f[t] output from the microcomputer 1. The transmitter circuit in this embodiment forms burst pulse signals of a sine wave as shown in FIG. 3. The burst pulse signals formed by the transmitter circuit 2 are output to the sinusoidal wave generator 4, and are output to the transmitter/receiver microphone 5 after having been added with a voltage component (offset voltage) for driving the transmitter/receiver microphone 5 through the power supply device 3.

The sinusoidal wave generator 4 generates sine waves of a given angular frequency ($\omega_1$). The sinusoidal wave generator 4 of this embodiment is capable of also generating sine waves of an angular frequency in synchronism with the angular frequency ($\omega$) of the burst pulse signals output from the transmitter circuit 2. The sine wave signals generated by the sinusoidal wave generator 4 are output to the phase shifter 7 and to the multiplier 8a.

Figure 2:
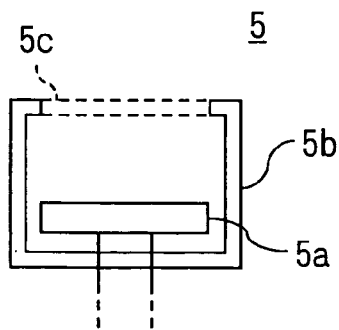
FIG. 2 is a view illustrating a transmitter/receiver microphone according to the first embodiment.

The transmitter/receiver microphone 5 is an ultrasonic wave sensor which, as shown in FIG. 2, is constituted by a piezoelectric element 5a, a cover 5b surrounding the piezoelectric element 5b, and a protector screen 5c. The transmitter/receiver microphone 5 is configured so that when the burst pulse signals are fed to the piezoelectric element 5a from the transmitter circuit 2, the piezoelectric element 5a is driven, and ultrasonic waves generated thereby are transmitted to an external unit via the protector screen 5c.

The transmitter/receiver microphone 5 receives the waves reflected from the ultrasonic waves which it has transmitted, whereby the piezoelectric element 5a generates a voltage. The voltage that is generated is amplified by the AMP 6 and is output to the multipliers 8a and 8b.

Although the apparatus 100 for detecting a distance of this embodiment is shown as only employing one transmitter/receiver microphone 5, it may also employ a plurality of transmitter/receiver microphones 5. In this case, a switch is provided for changing over the plurality of transmitter/receiver microphones 5, and the switch is controlled by the microcomputer 1 so as to be changed over at regular intervals to change the transmitter/receiver microphones 5 that are to be used. By using the plurality of transmitter/receiver microphones 5, therefore, it is allowed to detect the bodies existing in a multiplicity of directions of the vehicle. In this case, the constitution can be used in common except the transmitter/receiver microphones 5 to reduce the cost of the apparatus 100 for detecting the distance.

Figure 4:
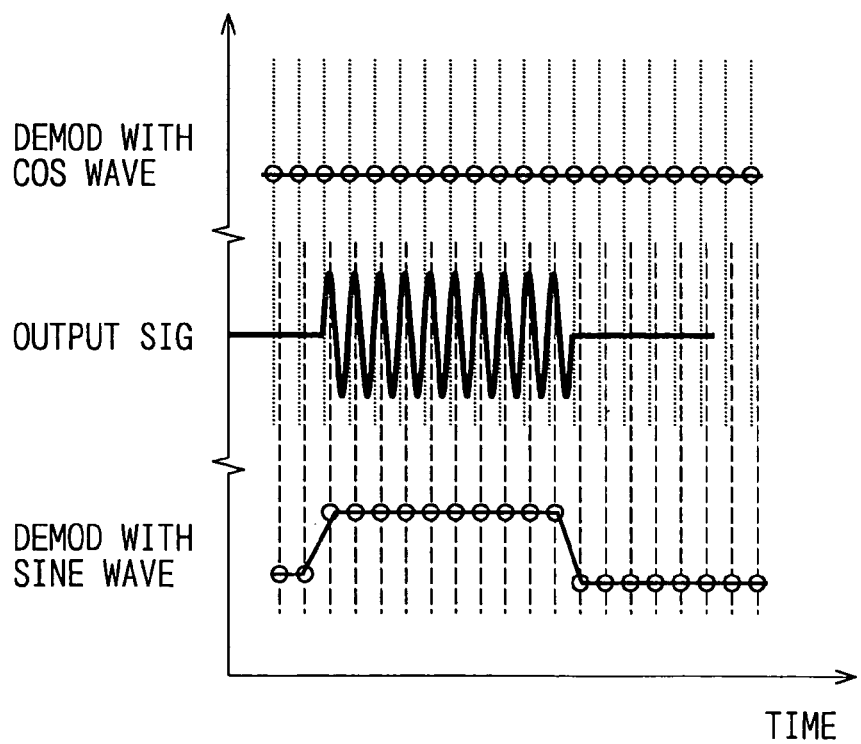
FIG. 4 is an image diagram illustrating the concept of orthogonal demodulation according to the first embodiment.

The phase shifter 7, multipliers 8a, 8b, and LPFs 9a, 9b are used for orthogonally demodulating the output signals from the AMP 6. That is, the sine wave signals from the sinusoidal wave generator 4 are divided into two, the one part thereof being input to the multiplier 8b after the phase thereof is changed through the phase shifter 7, and the other part thereof being directly input to the multiplier 8a. The output voltage signal from the transmitter/receiver microphone 5 is multiplied thereby through the multipliers 8a and 8b, filtered through the LPFs 9a and 9b, thereby to demodulate the output signal from the transmitter/receiver microphone 5. FIG. 4 is an image diagram of the orthogonal demodulation; i.e., the output signals of the transmitter/receiver microphone 5 are demodulated by being multiplied by cosine waves and sine waves of the angular frequency ($\omega_1$).

The phase shifter 7 shifts the phase of the sine wave signals from the sinusoidal wave generator 4 to a predetermined phase. The multiplier 8a multiplies the output signal from the AMP 6 by the sine wave signal from the sinusoidal wave generator 4, and the multiplier 8b multiplies the output signal from the AMP 6 by the sine wave signal of which the phase is shifted through the phase shifter 7.

The LPFs 9a and 9b are used for removing high-frequency components contained in the output signals from the multipliers 8a and 8b. The ADCs 10a and 10b work to sample the demodulated signals from the LPFs 9a and 9b at a predetermined sampling frequency (e.g., several times as great as the frequency of the pulse signals f[t]) and convert them into digital signals thereof, and send them to the microcomputer 1.

The microcomputer 1 adds up the vectors of the demodulated signals of which the in-phase components and the orthogonal components have been digitized through the ADCs 10a and 10b. The microcomputer 1 detects a distance to a body from a time difference between the time of starting the transmission of transmission signals and the time at which the result of vector addition exceeds a predetermined threshold value.

This embodiment gives attention to the fact that the transmission waves transmitted from the transmitter/receiver microphone 5 have nearly the same frequency component as the reflected waves thereof, and brings the angular frequency ($\omega_1$) of the sine wave signals from the sinusoidal wave generator 4 used for the orthogonal demodulation into synchronism with the angular frequency ($\omega$) of the burst pulse signals f[t], and effects the orthogonal demodulation by using the sine wave signals of the synchronized angular frequency to thereby improve the SN ratio of the signals received by the microcomputer 1. Characteristic portion of the embodiment will now be described hereinbelow.

As described above, first, when the piezoelectric element 5a is to be driven by the burst pulse signals formed from the pulse signals f[t] of the angular frequency ($\omega$), the fundamental component of the transmission waves transmitted by driving the piezoelectric element 5a is expressed by the following formula (24). In the following formula (24), ($\theta$) represents the phase difference formed as the transmission waves propagate through a passage along which the transmission waves are reflected by the body to be detected and are received.

$$\text{Transmission waves} = f[t] \times \cos(\omega t + \theta) \quad (24)$$

If the output signals from the piezoelectric element 5a of reflected waves having a frequency component nearly equal to the transmission waves are orthogonally demodulated by using sine wave signals of the angular frequency ($\omega_1$), there are obtained the demodulated signals as expressed by the following formula (25), $$\text{Demodulated signals} = f[t] \times \cos(\omega t + \theta) \times \cos(\omega_1 t) + j\{f[t] \times \cos(\omega t + \theta) \times -\sin(\omega_1 t)\} = (\tfrac{1}{2}) \times f[t] \times \{\cos(\omega t + \theta + \omega_1 t) + \cos(\omega t + \theta - \omega_1 t)\} - (\tfrac{1}{2}) \times j\{\sin(\omega t + \theta + \omega_1 t) + \sin(-\omega t - \theta + \omega_1 t)\} \quad (25)$$

When the orthogonal demodulation is effected with the sine wave signals of the angular frequency ($\omega_1$), the demodulated signals are obtained in a form being separated into signals of the in-phase component (I) and signals of the orthogonal component (Q) (terms to which j is imparted) for the sine wave signals.

On the other hand, when the orthogonal demodulation is effected by using sine wave signals of an angular frequency ($\omega_1 = \omega$) in synchronism with the angular frequency ($\omega$) of the burst pulse signals, the demodulated signals are expressed by the following formula (26), Demodulated signals=$(\frac{1}{2}) \times f[t] \times \{\cos(\omega t + \theta + \omega t) + \cos(\omega t + \theta - \omega t)\} - (\frac{1}{2}) \times j \{\sin(\omega t + \theta + \omega t) + \sin(-\omega t - \theta + \omega t)\} = (\frac{1}{2}) \times f[t] \times \{\cos(2\omega t + \theta) + \cos(\theta)\} - (\frac{1}{2}) \times j \{\sin(2\omega t + \theta) + \sin(-\theta)\}$ (26)

If the component of a frequency twice as great as the angular frequency ($\omega$) is removed from demodulated signals expressed by the above formula (26) by using LPFs 10a and 10b, the output signals from the LPFs 10a and 10b are expressed by the following formula (27), LPF output=$(\frac{1}{2}) \times f[t] \times +\cos(\theta) + j(\frac{1}{2}) \times \sin(\theta) = A \times f\{t\} \times e^{j\theta}$ (27)

where A is a constant.

As described above, the signals of reflection waves of a frequency component nearly equal to that of the transmission waves are orthogonally demodulated with sine wave signals of an angular frequency in synchronism with the angular frequency ($\omega$) of burst pulse signals for oscillating the piezoelectric element 5a to remove components of a frequency twice as high contained in the demodulated signals and, hence, to obtain pulse signals f[t] having a phase difference ($\theta$) and an amplitude of (1/A) times as great.

Figure 5A:
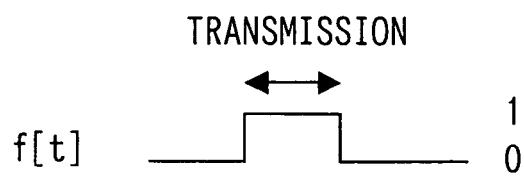
FIG. 5A is a diagram illustrating a section for transmitting burst pulse signals.
Figure 5B:
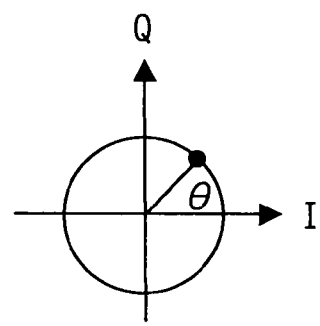
FIG. 5B is a diagram in which a direction of a point is represented on an IQ plane by a vector of a demodulated signal after the orthogonal demodulation.

Referring, for example, to FIG. 5B illustrating a complex plane (IQ plane) consisting of a signal of the in-phase component (I) and a signal of an orthogonal component (Q), the demodulated signals from which the component of a frequency of twice as high is removed become the vectors representing the same direction (a point on the IQ plane) at all times in a section where the burst pulse signals are transmitted in FIG. 5A.

Figure 6A:
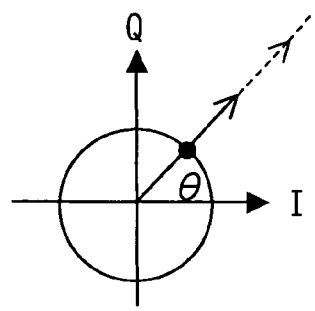
FIG. 6A is a diagram of a case when the vector of the demodulated signal increases due to the addition of vectors.

Therefore, the orthogonally demodulated signals are sampled at a predetermined sampling frequency for a period of time equal to a section of transmitting the transmission waves, and the sampled and demodulated signals are added up (addition of vectors) for each in-phase component and orthogonal component to obtain a vector of a length (magnitude) proportional to the number of times of addition as shown in FIG. 6A.

Figure 7:
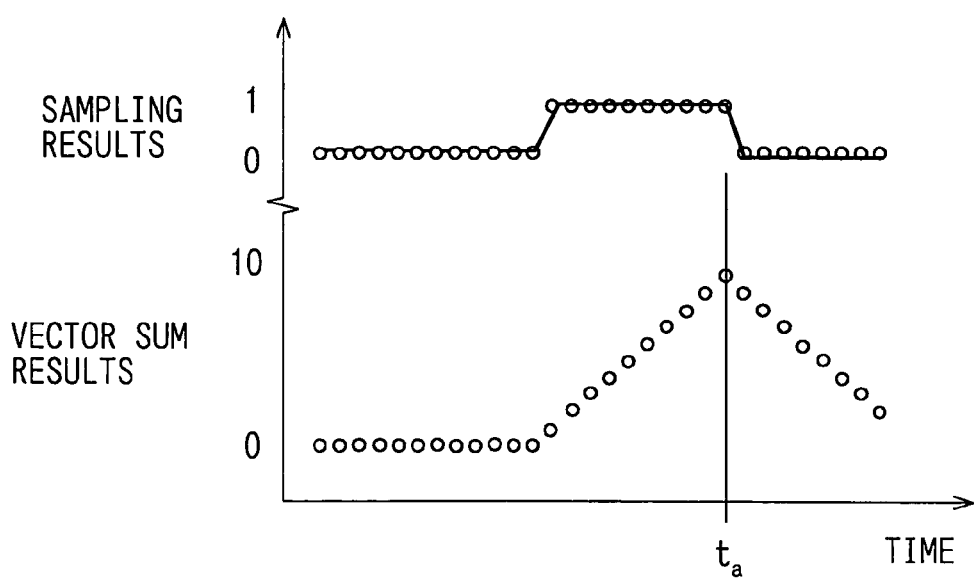
FIG. 7 is an image diagram illustrating a vector addition processing according to the first embodiment.

Referring, for example, to FIG. 7, the addition of vectors stands for plotting the added results of 10 samples from every time of the sampled result. As shown in FIG. 7, the plotted result of addition assumes a maximum value at a time ($t_a$) just before the sampled results break. A distance to a body is detected from a time difference between the time of starting the transmission of transmission waves and the time when the plotted result of addition becomes a maximum.

Figure 5C:
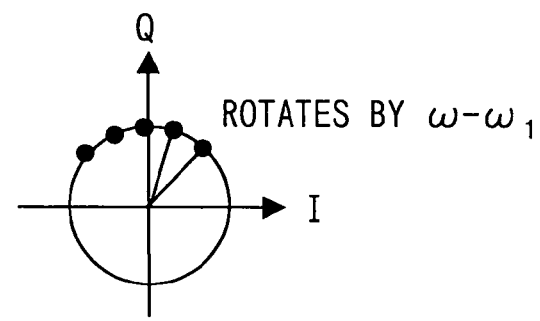
FIG. 5C is a diagram illustrating a case where the vectors of demodulated signals after the orthogonal demodulation are turning on the IQ plane.
Figure 6B:
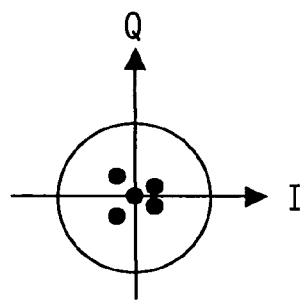
FIG. 6B is a diagram of a case where the vector of the demodulated signal does not increase by the addition of vectors.

On the other hand, the demodulated signals obtained by the orthogonal demodulation by using sine wave signals of an angular frequency ($\omega_1$) which is not in synchronism with the burst pulse signals, represent vectors in different directions on the IQ plane as shown in FIG. 5C. When, for example, the angular frequency ($\omega_1$) is smaller than the angular frequency ($\omega$), the vectors represented on the IQ plane rotate with the origin as a center. Therefore, even if the vectors are added, the added result does not become a large vector as shown in FIG. 6B. At a time ($t_a$) just before the sampled result breaks shown in FIG. 7, therefore, the plotted result of addition does not assume a maximum value, and a distance to the body is not correctly detected.

Namely, the signals of reflection waves of a frequency component nearly the same as that of the transmission waves are orthogonally demodulated with the sine wave signals of an angular frequency in synchronism with the angular frequency ($\omega$) of pulse signals for exciting the piezoelectric element, the demodulated signals from which the component of a frequency twice as high is removed, are added up for their vectors, and the body is detected by using the demodulated signals of which the vectors are added up to detect a distance up to the body by using the demodulated signals having an improved SN ratio. This makes it possible to lower the signal level of the demodulated signals and, hence, to decrease the consumption of electric power and to lengthen the distance to the body that can be detected.

MODIFIED EXAMPLE 1

In the embodiment, the orthogonal demodulation is effected by using sine wave signals of an angular frequency in synchronism with the angular frequency ($\omega$) of the burst pulse signals. Here, however, the angular frequency of the sine wave signals used for the orthogonal demodulation may be selected to be equal to the resonance angular frequency of the transmitter/receiver microphone 5.

Namely, in general, the pulse signals f[t] for driving the transmitter/receiver microphone 5 are set in advance to be in agreement with the resonance frequency of the piezoelectric element 5a, so that the piezoelectric element 5a efficiently receives the reflected waves. By orthogonally demodulating the reflected wave signals by using the sine wave signals of a frequency nearly equal to the resonance frequency of the piezoelectric element 5a, therefore, the action and effect same as those of this embodiment can be expected.

MODIFIED EXAMPLE 2

When, for example, a body reflecting the transmission waves is in motion, a frequency component of an angular frequency ($\omega_2$) is added to the reflected waves received by the transmitter/receiver microphone 5 because of the Doppler effect. The reflected waves affected by the Doppler effect are orthogonally demodulated, and the demodulated signals are passed through the LPF to be added with a term $e^{j\omega 2t}$ relative to the above formula 27 and to be added with a rotational vector $e^{j\omega 2}$ on the IQ plane as expressed by the following formula (28), LPF output=$A \times f[t] \times e^{j\theta} \times e^{j\omega 2t}$ (28)

When the reflecting body is in uniform motion, however, the angular frequency ($\omega_2$) assumes a constant value, and the above formula (28) can be rewritten as the following formula (29), LPF output=$A \times f[t] \times e^{j\theta} \times e^{j\omega 2t} = A \times f[t] \times e^{j\theta} \times e^{j\theta(t)}$ (29)

Here, a difference between the output signal produced last time by the LPF and the output produced this time can be expressed by the following formula (30), Difference detected=$A1 \times f[t] \times e^{j\theta} \times e^{j\theta[t]}/\{A2 \times f[t] \times e^{j\theta} \times e^{j\theta[t+1]}\} = A3 \times e^{j\{\theta[t]-\theta[t+1]\}} = A3 \times e^{j\theta 2}$ (30)

where A1 to A3 are constants.

As described above, the demodulated signals having the differential produce the vectors (differential vectors) in a direction of the phase ($\theta$2) on the IQ plane. By finding a difference between the demodulated signal sampled last time by the ADCs 10a, 10b and the demodulated signal sampled this time by the microcomputer 1 and by adding up the differential vectors, therefore, the SN ratio of the demodulated signals can be improved even when the reflecting body is in uniform motion.

MODIFIED EXAMPLE 3

Even when the differential vectors are not added up in the modified Example 2 or even when the differential vectors are added up, the vectors do not represent a predetermined direction on the IQ plane when the reflecting body is accelerating, and rotate on the IQ plane.

Therefore, the time for adding up the vectors is set to be shorter than the time of transmitting the burst pulse signals to suppress the directions of the vectors within a given range. As a result, the SN ratio of the demodulated signals can be improved to some extent. The time for adding up the vectors may be set so that the range in which the added vectors disperse is, for example, about $\pm\pi/2$.

MODIFIED EXAMPLE 4

In the embodiment, provision may be made of means for arbitrarily varying the section for transmitting the burst pulse signals to the transmitter/receiver microphone 5 from the transmitter circuit 2. The time width for adding up the vectors may be varied depending upon the varied section for transmission.

MODIFIED EXAMPLE 5

In the embodiment, the time not longer than the section for transmitting the burst pulse signals is for adding up the vectors. However, it is also allowable that the transmitter/receiver microphone 5 transmits the transmission waves, the microcomputer 1 stores the demodulated signals of which the vectors are added up for each cycle for receiving the reflected waves, the demodulated signals of which the vectors are added up of a plurality of cycles are averaged to find an average value of signal levels of the demodulated signals, thereby to detect the body by using the calculated average value of the demodulated signals. This makes it possible to stabilize the detection of the body.

Second Embodiment

Figure 8:
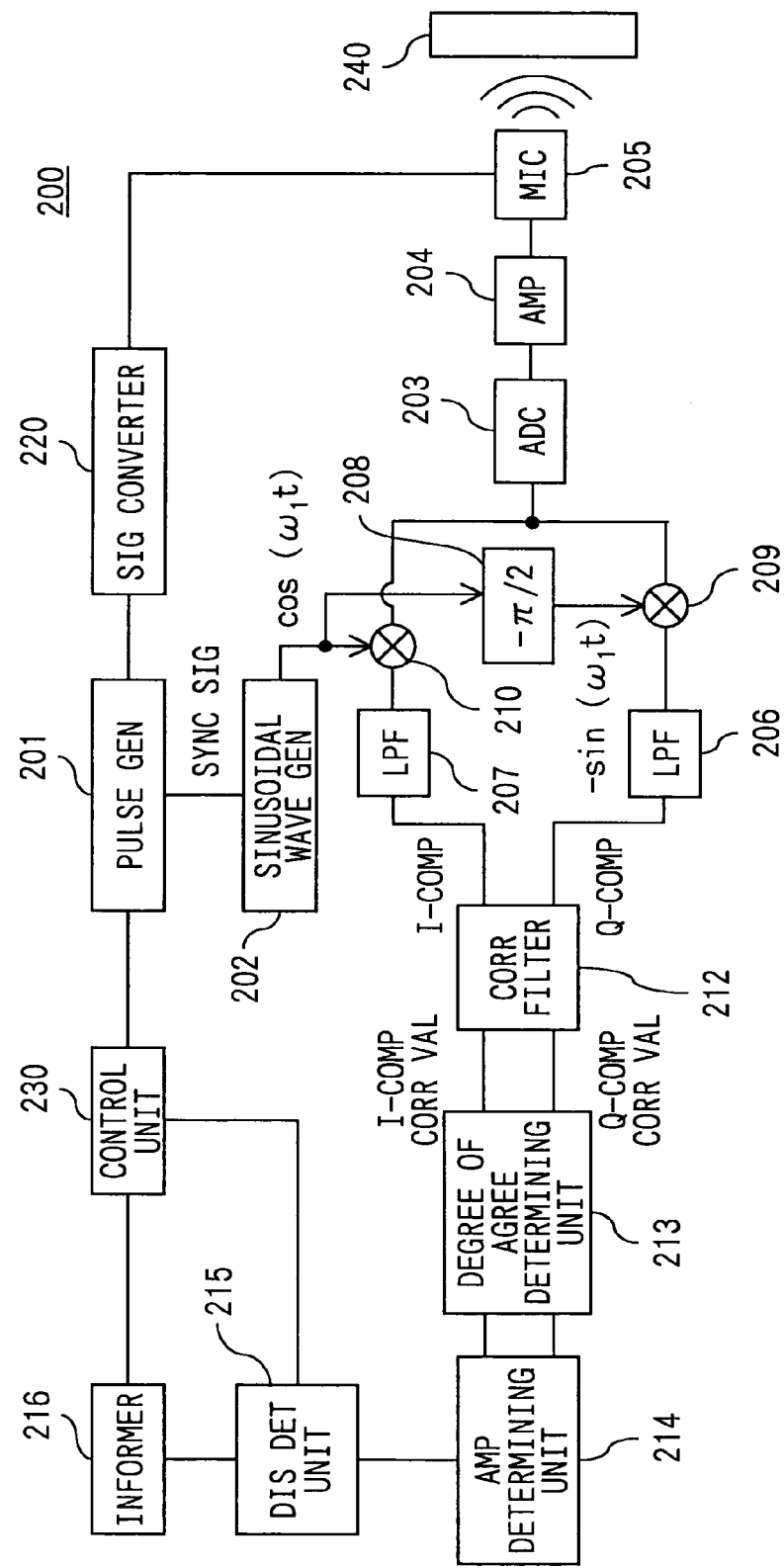
FIG. 8 is a diagram illustrating the constitution of an apparatus for detecting a body according to a second embodiment.

FIG. 8 is a diagram illustrating the constitution of an apparatus for detecting a body according to this embodiment. As shown, an apparatus 200 for detecting a body of the embodiment is constituted by a pulse generator 201, a sinusoidal wave generator 202, an ADC (analog/digital converter) 203, an AMP (amplifier) 204, a microphone 205, LPFs (low-pass filters) 206 and 207, a phase shifter 208, multipliers 209 and 210, and a signal converter 220.

Further, the apparatus 200 for detecting a body includes a microcomputer that is not shown, and has calculation processing functions such as of a correlation filter 212, a degree-of-agreement determining unit 213, an amplitude determining unit 214, a distance detecting unit 215, an informing unit 216 and a control unit 230.

The pulse generator 201 generates burst pulse signals (hereinafter simply called pulse signals f[t]) of an angular frequency ($\omega$) constituted by a plurality of pulse trains of a plurality of pulses, and sends the pulse signals (f[t]) to the signal converter 220. The control unit 230 controls the time duration for continuously generating the pulses.

The signal converter 220 digitally modulates the phase of the pulse signals (f[t]) by the sign of the phase, i.e., changes the phase for each pulse train of pulse signals (f[t]) according to a sign train constituted by a combination of a plurality of signs.

The sinusoidal wave generator 202 generates sine waves of a given angular frequency ($\omega_1$). The sinusoidal wave generator 202 of this embodiment is capable of also generating sine waves of an angular frequency in synchronism with the angular frequency ($\omega$) of the pulse signals (f[t]) output from the pulse generator 201. The sine wave signals generated by the sinusoidal wave generator 202 are output to the phase shifter 208 and to the multiplier 210.

Figure 9A:
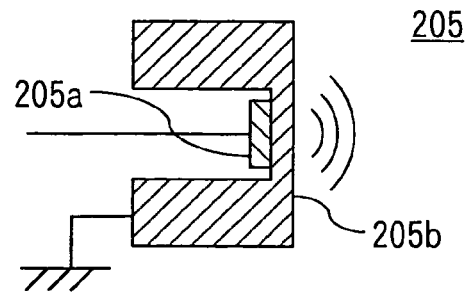
FIG. 9A is a diagram illustrating the constitution of a microphone.

The microphone 205 is an ultrasonic wave sensor which, as shown in FIG. 9A, is constituted by a piezoelectric element 205a and a cover 205b surrounding the piezoelectric element 205a. The microphone 205 is a resonance type microphone of which the cover 205b resonates accompanying the drive of the piezoelectric element 205a. That is, the microphone 205 is such that when the modulated signals obtained by changing the phase of the pulse signals (f[t]) through the signal converter 220 are fed to the piezoelectric element 205a, the piezoelectric element 205a is driven causing the cover 205b to resonate, and ultrasonic waves generated thereby are transmitted to an external body 240 that is to be detected.

By varying the phase of the pulse signals (f[t]) for driving the piezoelectric element 205a as described above, the phases of the waves transmitted from the microphone 205 can be digitally modulated.

Figure 9B:
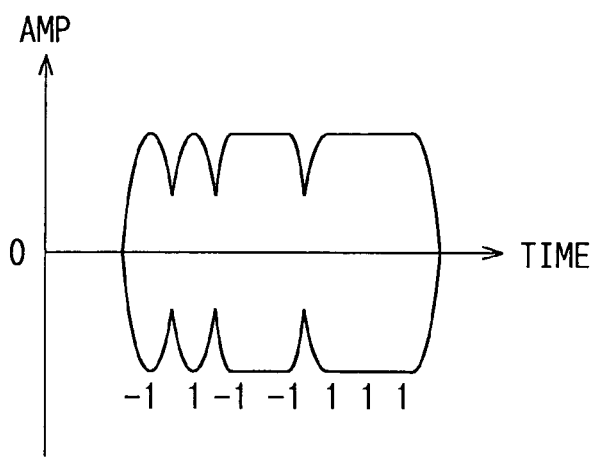
FIG. 9B is a diagram illustrating the amplitude of phase-modulated ultrasonic waves transmitted from the microphone.
Figure 9C:
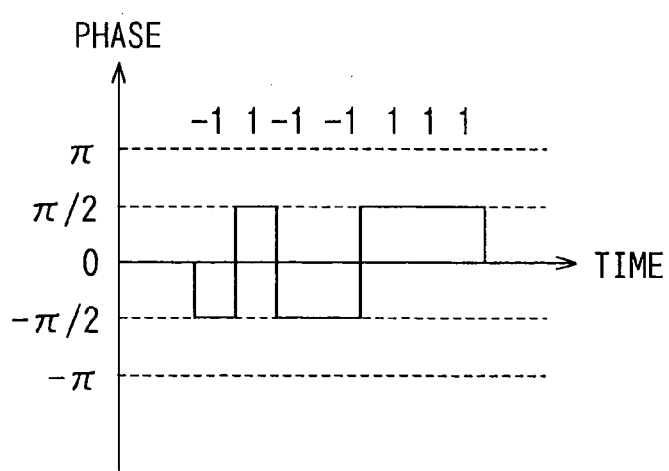
FIG. 9C is a diagram illustrating the phases of phase-modulated ultrasonic waves transmitted from the microphone.

FIG. 9B is a diagram illustrating the amplitude of ultrasonic waves transmitted from the microphone 205 and of which the phase is modulated, and FIG. 9C is a diagram illustrating a change in the phase. As for the signs of a sign train of this embodiment as shown, a sign "−1" is assigned to a pulse train which delays the phase of the pulse train of pulse signals (f[t]) by ($\pi/2$) and, conversely, a sign "1" is assigned to a pulse train which advances the phase of the pulse train by ($\pi/2$).

Further, the microphone 205 receives the reflected ultrasonic waves transmitted thereby. Upon receiving the reflected waves, the piezoelectric element 205a generates a voltage. The generated voltage is amplified to a predetermined number of times through the AMP 204, and is output to the ADC 203.

The ADC 203 samples the received signals output from the AMP 204 at a predetermined sampling frequency (e.g., several times of the frequency of the pulse signals f[t]), converts them into digital signals, and outputs the received signals that have been converted to the multipliers 209 and 210.

The device 200 for detecting a body of this embodiment employs only one microphone 205 but may employ a plurality of microphones 205. In this case, a switch is provided for changing over the plurality of microphones, and is controlled so as to be changed over at regular intervals to change the microphones that are to be used. By using the plurality of microphones, therefore, it is allowed to detect the bodies existing in a multiplicity of directions of the vehicle. In this case, the constitution can be used in common except the microphones 205 to reduce the cost of the apparatus 200 for detecting the body.

The phase shifter 208, multipliers 209, 210, and LPFs 206, 207 are used for orthogonally demodulating the received signals from the ADC 203. That is, the sign wave signals from the sinusoidal wave generator 202 are divided into two, the one part thereof being input to the multiplier 209 after the phase thereof is changed through the phase shifter 208, and the other part thereof being directly input to the multiplier 210. The received signals from the ADC 203 are multiplied through the multipliers 209, 210, filtered through the LPFs 206 and 207 to remove high-frequency components, and are demodulated.

The phase shifter 208 shifts the phase of the sine wave signals from the sinusoidal wave generator 202 to a predetermined phase (e.g., −π/2). The multiplier 210 multiplies the received signals from the ADC 203 by the sine wave signals from the sinusoidal wave generator 202, and the multiplier 209 multiplies the received signals from the ADC 203 by the sine wave signals of which the phase is shifted through the phase shifter 208. Thus, the received signals are separated into in-phase components (I-components) and orthogonal components (Q-components).

The LPFs 206 and 207 are used for removing the high-frequency components contained in the I-components and Q-components of received signals output from the multipliers 209 and 210, and output the received signals of I-components and Q-component from which the high-frequency components have been removed to the correlation filter 212.

The correlation filter 212 is for compressing the pulse width of the received signals, i.e., multiplies the sign of the received signal by a conjugated complex sign of the modulated signal a plurality of number of times at timings that differ in time relative to the received signal, calculates differential vector between the multiplied results and the preceding multiplied result for each sign, adds up the calculated differential vectors for each sign, averages the added results, finds a correlated value between the received signals and the modulated signals for each I-component and Q-component, determines the degree of agreement of signs of the differential vectors, and sends a degree-of-agreement signal dependent on the determined result to the degree-of-agreement determining unit 213.

The degree-of-agreement determining unit 213 determines whether a correlated value signal for each I-component and Q-component found by the correlation filter 212 be output to the amplitude judging unit 214. That is, when the correlation filter 212 so determines that the signs of the differential vectors (directions represented by the differential vectors) have a high degree of agreement, the correlated value signal is sent to the amplitude determining unit 214 for each I-component and Q-component. When the determined result is such that the signs of the differential vectors have a low degree of agreement, a value (e.g., 0) is output to indicate that the received signal is invalid.

When the degree-of-agreement determining unit 213 outputs a correlated value signal for each I-component and Q-component, the amplitude determining unit 214 calculates the amplitude of the received signal from the corrected value signal of I- and Q-components. When the amplitude is greater than a preset amplitude level, the amplitude determining unit 214 determines the time in which the amplitude is greater than the preset amplitude level to be the timing of reception (reception timing). The distance detecting unit 215 detects a distance to the reflecting body from a time difference between the timing for generating the pulse signal (f[t]) (or, in other words, a timing for transmitting the ultrasonic waves from the microphone) and the timing for receiving the reflected waves. When the distance detected by the distance detecting unit 215 is within a predetermined distance, the informing unit 216 generates an alarm to let the driver of the vehicle know that the body is approaching.

In this embodiment, the modulated signals obtained by digitally modulating the phases of the pulse signals (f[t]) by using a sign are transmitted as transmission waves, and the received signals of the reflected waves thereof are compressed by using differential vectors between the received signals and the modulated signals to improve the SN ratio of the received signals.

Figure 13A:
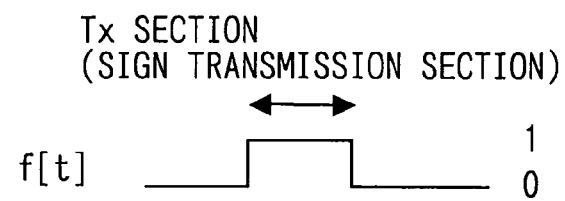
FIG. 13A is a diagram illustrating a section for transmitting transmission signals.
Figure 13B:
FIG. 13B is a diagram illustrating a transmission signal of which the phase is modulated.

A characteristic portion of this embodiment will now be described. First, the pulse generator 201 generates the pulse signals (f[t]) of the angular frequency (ω) as transmission signals and transmits the transmission signals while digitally modulating the phases thereof. In this case, the fundamental component of the transmission waves is expressed by the following formula (31), $$\text{Transmission waves} = f[t] \times \cos(\omega t + \theta[t]) \quad (31)$$

where θ[t] is a function representing a modulation component in the transmission signals of which the phase is modulated as shown, for example, in FIG. 13B.

If the received signals of reflection waves having a frequency component nearly equal to the transmission waves are orthogonally demodulated by using sine wave signals of an angular frequency ($\omega_1 t + \theta 2$) and are separated into the in-phase components and the orthogonal components of the demodulated signals, the demodulated signals become as expressed by the following formula (32), $$\begin{aligned}\text{Demodulated signals} &= f[t] \times \cos(\omega t + \theta[t]) \times \cos(\omega_1 t + \theta 2) + j\{f[t] \times \cos(\omega t + \theta[t]) \times -\sin(\omega_1 t + \theta 2)\} = (1/2) \times f[t] \times \{\cos(\omega t + \theta[t] + \omega_1 t + \theta 2) + \cos(\omega t + \theta[t] - \omega_1 t - \theta 2)\} - (1/2) \times j\{\sin(\omega t + \theta[t] + \omega_1 t + \theta 2) + \sin(-\omega t - \theta[t] + \omega_1 t + \theta 2)\}\end{aligned} \quad (32)$$

where θ2 is a phase difference produced when the transmission wave propagates through a passage along which it is reflected by the body to be detected and is received.

When the orthogonal demodulation is effected with the sine wave signals of the angular frequency ($\omega_1 = \omega$) in synchronism with the angular frequency (ω) of pulse signals (f[t]), the demodulated signals are expressed by the following formula (33), $$\begin{aligned}\text{Demodulated signals} &= (1/2) \times f[t] \times \{\cos(\omega t + \theta[t] + \omega t + \theta 2) + \cos(\omega t + \theta[t] - \omega t - \theta 2)\} - (1/2) \times j\{\sin(\omega t + \theta[t] + \omega t + \theta 2) + \sin(-\omega t - \theta[t] + \omega t + \theta 2)\} = (1/2) \times f[t] \times \{\cos(2\omega t + \theta[t] + \theta 2) + \cos(\theta[t] - \theta 2)\} - (1/2) \times j\{\sin(2\omega t + \theta[t] + \theta 2) + \sin(-\theta[t] + \theta 2)\}\end{aligned} \quad (33)$$

If the component of a frequency twice as great as the angular frequency (θ) is removed from demodulated signals expressed by the above formula (33) by using LPFs 206 and 207 having a function of the orthogonal demodulation, the output from the LPFs 206 and 207 is expressed by the following formula (34), $$\text{LPF output} = (1/2) \times f[t] \times +\cos(\theta[t] - \theta 2) + j(1/2) \times \sin(\theta[t] - \theta 2) = A \times f\{t\} \times e^{j(\theta[t] - \theta 2)} \quad (34)$$

where A is a constant.

As described above, the orthogonal demodulation is effected by using sine wave signals of an angular frequency in synchronism with the angular frequency (ω) of pulse signals f[t] and the component of a frequency twice as high contained in the demodulated signals is removed therefrom to pick up the amplitude (A) component and the phase component (θ[t]−θ2) of the received signals. As a result, the received signals having an improved SN ratio can be compressed through the correlation filter 212. Though this embodiment employs the orthogonal demodulation as a method of picking up the amplitude component and the phase component of the received signals, the invention is not limited to the one of the above orthogonal demodulation.

Here, when the body to be detected is at rest (not moving), the correlation filter 212 may compress the pulses without using differential vectors. That is, in order to find a correlation between the received signals output from the LPFs 206, 207 and the demodulated signals, the sign of the received signals is multiplied by a conjugated complex sign of the modulated signals a plurality of number of times at timings that differ in time relative to the received signal, and the multiplied results are added up, and the added results are averaged according to the following formula (35), $$(1/N) \times \Sigma \{A \times f[t] \times e^{j(\theta[t]-\theta2)} \times e^{-j\theta[t]}\} = (1/N) \times \Sigma \{A \times f[t] \times e^{-j\theta 2}\} \quad (35)$$

wherein N is a number of signs of a sign train (unit of modulation).

Figure 13C:
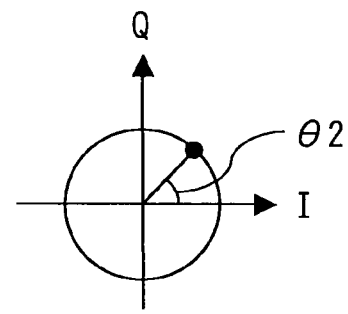
FIG. 13C is a diagram illustrating a vector in a predetermined direction (a point on the IQ plane) in a section for transmitting the transmission signals.
Figure 13D:
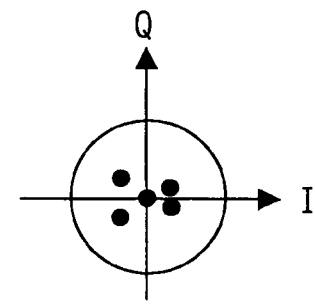
FIG. 13D is a diagram illustrating vectors at random on the IQ plane.

If the calculated result of the above formula (35) is shown on a complex plane (IQ plane) comprising the in-phase component (I) and the orthogonal component (Q), there is obtained a vector in a predetermined direction (a point on the IQ plane) as shown in FIG. 13C in a section of transmitting the transmission signals in FIG. 13A. By adding and averaging the multiplied results, further, there is obtained a vector of a magnitude proportional to the number of times of addition. As for the noise contained in the received signals, on the other hand, there is no correlation between the noise signals that are received and the modulated signals even when there are received waves of a frequency nearly equal to the transmission waves. As shown in FIG. 13D, therefore, the noise becomes random on the IQ plane, and the vectors thereof are small.

Figure 11:
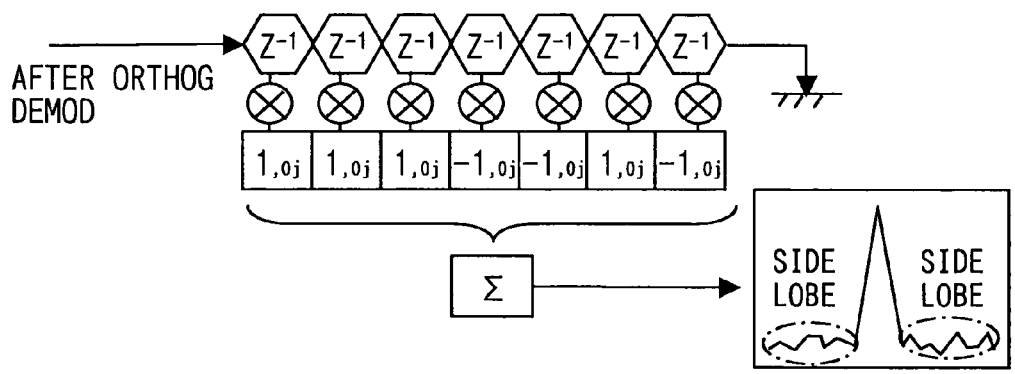
FIG. 11 is a diagram illustrating the functional constitution of a correlation filter for finding a correlation between the received signals and the modulated signals.

FIG. 11 illustrates a functional constitution of the correlation filter 212 for finding a correlation between the received signals output from the LPF and the modulated signals. The correlation filter 212 is for obtaining a correlation of signs between the received signals and the modulated signals, and its function is to execute the calculation processing of the above formula (35).

That is, the correlation filter 212 multiplies the sign of the received signals by a conjugated complex sign of the modulated signals a plurality of number of times at timings that differ in time relative to the received signals, adds up the multiplied results, and averages the added results to find a correlated value. By finding the correlated value by using the correlation filter 212 as described above, a difference can be distinguished between a peak in the correlated value representing the degree of correlation and the correlated value other than the peak (i.e., side lobe).

By transmitting the modulated signals obtained by digitally modulating the sign of the pulse signals (f[t]) as transmission waves and compressing the received signals of the reflected waves thereof by using the sign, it is made possible to improve the SN ratio of the received signals of waves reflected by the static body.

When the received signals of waves reflected not by a body that is at rest (not moving) but by, for example, a body that is in uniform motion are to be compressed, the frequency of the received signals of the reflected waves is shifted by the Doppler effect, and a result is obtained as expressed by the following formula (36), $$(1/N) \times \Sigma \{A \times f[t] \times e^{-j\theta 2} \times e^{j\Delta\theta[t]}\} \quad (36)$$

wherein Δθ[t] is a function representing a change in the phase due to the Doppler shift.

Figure 15A:
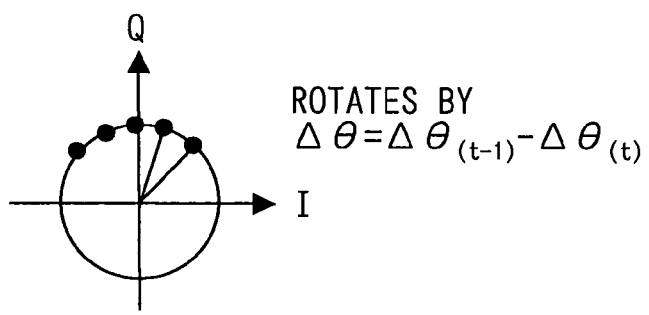
FIG. 15A is an image diagram illustrating vectors of received signals turning on the IQ plane when the phase changes due to the Doppler shift are added up.

This means, as illustrated in FIG. 15A, that when the waves are received for a period of time corresponding to a section for transmitting the pulse signals (f[t]), the amount of phase change due to the Doppler shift is added in the step of compressing the pulses whence the vector of the received signal rotates on the IQ plane making it difficult to favorably compress the pulse width of the received signals.

In order to find a correlation between the received signals of waves reflected by the body which is in uniform motion and the modulated signals as represented by the following formula (37), therefore, the correlation filter 212 of this embodiment multiplies the sign of the received signals by a conjugated complex sign of the modulated signals a plurality of number of times at timings that differ in time relative to the received signal, calculates a differential vector between the multiplied result and the preceding multiplied result for each sign, adds up the differential vectors calculated for each sign, and averages the added results, $$(1/N) \times \Sigma \{A \times f[t] \times e^{-j\theta 2} \times e^{j\Delta\theta[t-1]}\} \times \{A \times f[t] \times e^{-(-j\theta 2)} \times e^{-j\Delta\theta[t]}\} = (1/N) \times \Sigma \{A^2 \times f^2[t] \times e^{j\Delta\theta}\} \quad (37)$$

Figure 15B:
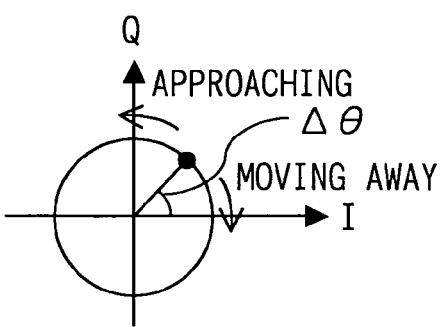
FIG. 15B is a diagram illustrating a vector of a predetermined phase (θ2) in a section of transmitting pulse signals (f[t])

If the result calculated according to the above formula (37) is shown on the IQ plane as shown in FIG. 15B, a predetermined phase difference (θ2) is exhibited in a section of transmitting the pulse signals (f[t]) in FIG. 13A, i.e., a vector is exhibited having a magnitude proportional to the number of times of addition.

Figure 12:
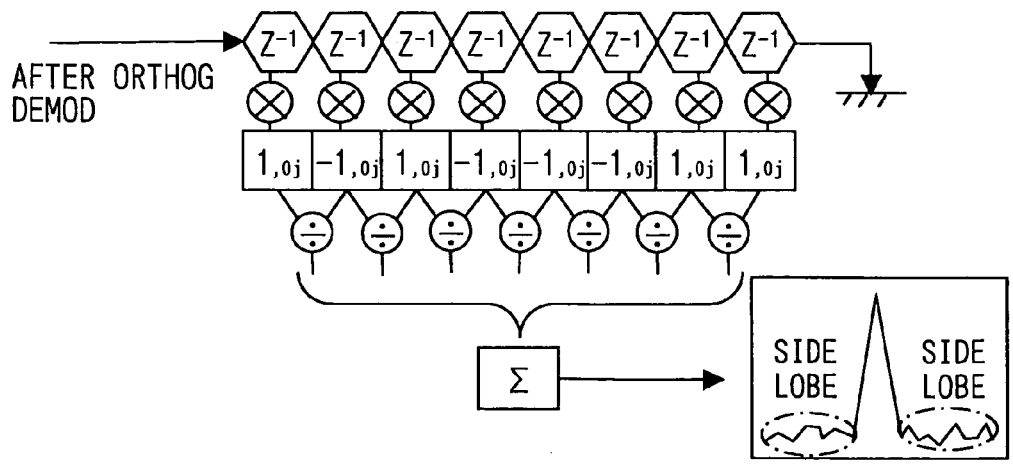
FIG. 12 is a diagram illustrating the functional constitution of the correlation filter for finding a correlation between the received signals and the modulated signals by using differential vectors.

FIG. 12 illustrates a functional constitution of a correlation filter 212 for finding a correlation between the received signals and the modulated signals relying on the difference in the vector. The correlation filter 212 is for obtaining a correlation of signs between the received signals and the modulated signals, and has a function of executing the calculation processing of the above formula 37.

That is, the correlation filter 212 multiplies the sign of the received 25 signals by a sign of the modulated signals a plurality of number of times at timings that differ in time relative to the received signals, calculates a differential vector between the multiplied result and the preceding multiplied result (e.g., one time before) for each sign, adds up the differential vectors calculated for each sign, and averages the added results to find a correlated value.

By finding a differential vector as described above, the shifting amount of frequency of the received signals due to the Doppler effect of when the body is in uniform motion is offset. By finding the correlation to the modulated signals from the averaged addition of differential vectors from which the shifting amount of frequency has been offset, it is allowed to distinguish a difference between a peak of correlated value representing the degree of correlation and a correlated value other than the peak (i.e., side lobe) as in the case of detecting a static body even when the body is in uniform motion. As a result, the SN ratio of the received signals is improved.

Even by receiving signals of the waves reflected by the static body, a result is obtained as calculated according to the following formula (38) by finding a correlated value by the correlation filter 212 using the differential vectors, $$(1/N) \times \Sigma \{A \times f[t] \times e^{-j\theta 2}\} \to (1/N) \times \Sigma \{A \times f[t] \times e^{-j\theta 2}\} \times \{A \times f[t] \times e^{-(-j\theta 2)}\} = (1/N) \times \Sigma \{A^2 \times f^2[t] \times e^{j0}\} = A^2 \times f^2[t] \quad (38)$$

Figure 14:
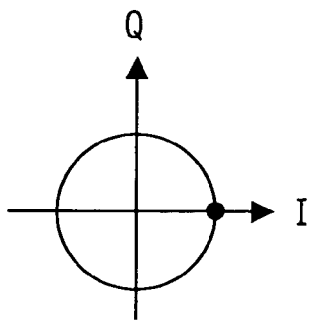
FIG. 14 is a diagram illustrating a vector representing a point on an I-axis in a section of transmitting the transmission signals on the IQ plane.

If the result calculated according to the above formula 38 is shown on the IQ plane, there is obtained, on the IQ plane, a vector representing a point on the I-axis as shown in FIG. 14. Even when a static body is detected, therefore, the SN ratio of the received signals can be improved.

Figure 17A:
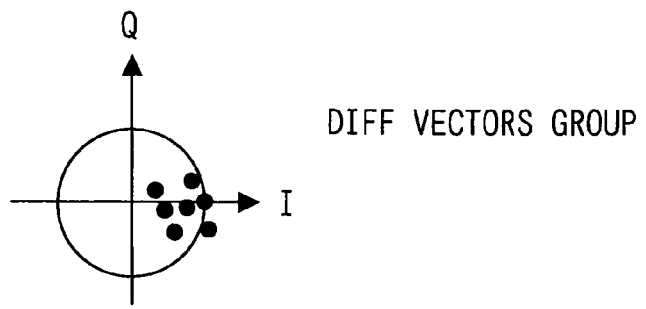
FIG. 17A is a diagram illustrating a group of differential vectors which are not concentrated on a point on the I-axis.
Figure 17B:
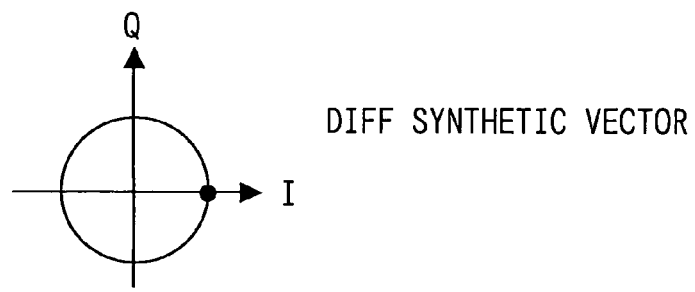
FIG. 17B is a diagram illustrating a differential synthetic vector.

The correlation filter 212, further, determines the degree of agreement of signs (directions of differential vectors) of the I-components and Q-components of the differential vectors. As described above, the differential vectors based on the received signals of the waves reflected by the body in uniform motion have a constant phase (Δθ) on the IQ plane in a section for transmitting the transmission signals as shown in FIG. 15B. When the speed of the body is very low, the differential vectors become as shown in FIG. 17B representing a point on the I-axis in the section for transmitting the transmission signals. When the received signals contain noise, on the other hand, the differential vectors are a group of differential vectors which are not concentrated at one point on the I-axis as shown in FIG. 17A.

Therefore, a direction of the group of differential vectors on the IQ plane can be used as an index of a degree of reliability of the received signals. By determining the degree of agreement concerning a direction of the group of differential vectors on the IQ plane, therefore, a body can be detected by using the received signals having a high degree of reliability.

In determining the degree of agreement by the correlation filter 212, for example, a differential synthetic vector is calculated by synthesizing the differential vectors, and the determination is rendered by using any one of the phase of the differential synthetic vector that is calculated, a sign of the in-phase component, or magnitudes of absolute values of the in-phase component and of the orthogonal component.

When, for example, the sign of the in-phase component of the differential synthetic vector is positive, it may be so determined that the degree of agreement is high concerning the directions of a plurality of differential vectors. Thus, by determining whether the sign of the in-phase component of the differential synthetic vector is positive, it is allowed to determine whether the differential synthetic vector is the one in a direction of within ±90 degrees. As a result, the degree of agreement can be easily determined.

Further, when an absolute value of the in-phase component of the differential synthetic vector is greater than an absolute value of the orthogonal component, it may be so determined that the degree of agreement is high concerning the directions of the differential vectors. By comparing the magnitude of the absolute value of the in-phase component of the differential synthetic vector with the magnitude of the absolute value of the orthogonal component, it is allowed to determine whether the differential synthetic vector is the one in a direction of within ±45 degrees. As a result, there is no need of calculating the phase for each differential vector.

It is further allowable to calculate a phase of the differential synthetic vector to determine whether the phase is within ±90 degrees or within ±45 degrees. By determining the degree of agreement concerning the directions of the differential vectors by using any one of the phase of the differential synthetic vector obtained by synthesizing a group of differential vectors, a sign of the in-phase component, or magnitudes of absolute values of the in-phase component and of the orthogonal component, the degree-of-agreement determining unit 213 determines whether the received signal has a high degree of reliability.

When the degree-of-agreement determining unit 213 produces a correlated value signal for each I-component and Q-component, the amplitude determining unit 214 calculates the amplitude of the received signal from the correlated value signal of the I- and Q-components. When the amplitude is greater than a preset amplitude level, the amplitude determining unit 214 determines the time in which the amplitude is greater than the amplitude level to be a timing of receiving the reflected waves (reception timing). Thus, by taking the amplitude level of the received signals determined to have a high degree of reliability into consideration, it is made possible to detect a body using the received signals having a higher degree of reliability.

Thus, the apparatus 200 for detecting a body of this embodiment transmits the modulated signals obtained by digitally modulating the phase of the pulse signals (f[t]) with a sign as transmission waves, and compresses the pulses by using differential vectors between the received signals of the reflected waves and the modulated signals. This improves the SN ratio of the received signals of waves reflected by the body even when the body to be detected is in uniform motion.

MODIFIED EXAMPLE 6

For example, when a velocity relative to the body and a change in the distance to the body are to be detected by using an ultrasonic sonar, the waves reflected by the body are received at least twice, and the data are detected from a difference in the time of the received signals. However, the correlation filter 212 of this embodiment finds the differential vectors and utilizes the phase of the differential vectors, thereby making it possible to detect the speed relative to the body and the change in the distance to the body by receiving the reflected waves only once.

That is, the time required for the phase of the differential vector to rotate once (360 degrees) on the IQ plane is found from the phase ($\Delta\theta$) of the differential vector and from the rate of modulating the pulse signals (f[t]) by the signal converter 220. Therefore, the frequency ($\Delta f$) of the Doppler shift amount is found from an inverse number of the time that is found. The thus found frequency ($\Delta f$) of the amount of Doppler shift is applied to the next formula to obtain a relative speed (V) of the reflecting body. In the following formula (39), C denotes the speed of sound (speed of light when the transmission waves are electromagnetic waves) and fp denotes a frequency of the pulse signals (f[t]), $$V = \Delta fp \times C/f \quad (39)$$

As described above, the waves reflected by the body are not received a plurality of number of times but are received only once to detect the velocity relative to the body from the phase of the differential vector of the received signals. Referring to FIG. 15B, it is allowed to detect whether the body is approaching or is moving away (to detect a change in the distance to the body) from the direction in which the differential vector is turning on the IQ plane.

Since the speed relative to the body can be detected from the phase of the differential vector as described above, it is possible to detect the acceleration or deceleration of the reflecting body from the difference of phase between at least two differential vectors and from the rate of modulation.

MODIFIED EXAMPLE 7

In determining the degree of agreement of signs (directions of the differential vectors) of the I-components and Q-components of the differential vectors, the correlation filter 212 of this embodiment calculates the differential synthetic vector by synthesizing the differential vectors, and renders the determination by using the phase of the calculated differential synthetic vector, sign of the in-phase component and the magnitudes of absolute values of the in-phase component and of the orthogonal component. In this modified example, however, determination is rendered based on the number of the I-components and Q-components of which the signs are in agreement.

When, for example, the number of the differential vectors in which the I-component have a positive sign is greater than a predetermined number or when the number of the differential vectors in which the absolute value of the I-component is greater than the absolute value of the Q-component, is greater than the predetermined number, it is so determined that the degree of agreement is high concerning the directions of the differential vectors.

Therefore, the number of differential vectors representing the directions within ±90 degrees can be determined based on the number of differential vectors in which the I-component has a positive sign, and the number of vectors representing the directions within ±45 degrees can be determined by comparing the magnitudes of the absolute value of the I-component and the absolute value of the Q-component in each differential vector.

Figure 18A:
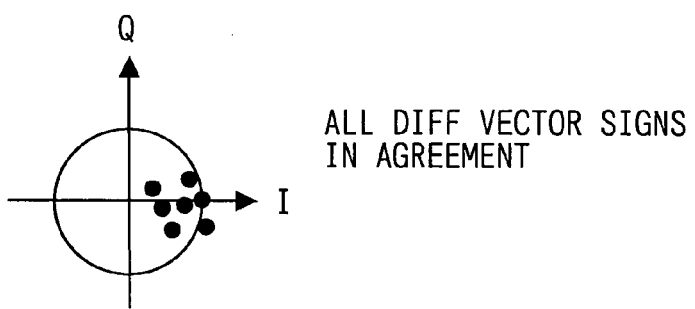
FIG. 18A is a diagram illustrating a case where the signs of all differential vectors are in agreement.
Figure 18B:
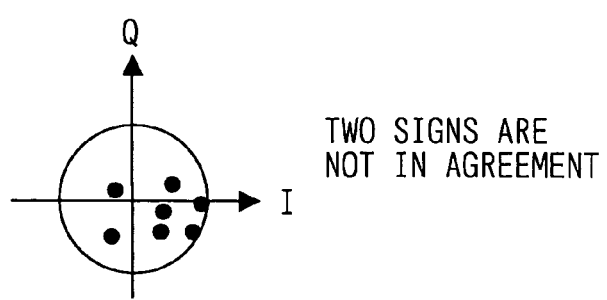
FIG. 18B is a diagram illustrating a case where the signs of five or more differential vectors are in agreement (signs of two differential vectors are not in agreement)

The predetermined numbers may be set through experiment. FIGS. 18A and 18B illustrate a case of rendering the determination based on the number of differential vectors in which the I-component has a positive sign. Here, it may be determined whether the signs of all differential vectors are in agreement as shown in FIG. 18A, or it may be determined whether the signs of not less than five differential vectors are in agreement (signs of two differential vectors are not in agreement).

MODIFIED EXAMPLE 8

When the correlation between the received signals and the modulated signals is to be found by using the differential vectors in the correlation filter 212 of this embodiment, the signal converter 220 may modulate the phases of the pulse signals (f[t]) by using a sign train constituted by signs of a combination different from a sign train that is used for finding the correlated value without using differential vectors.

Figure 16A:
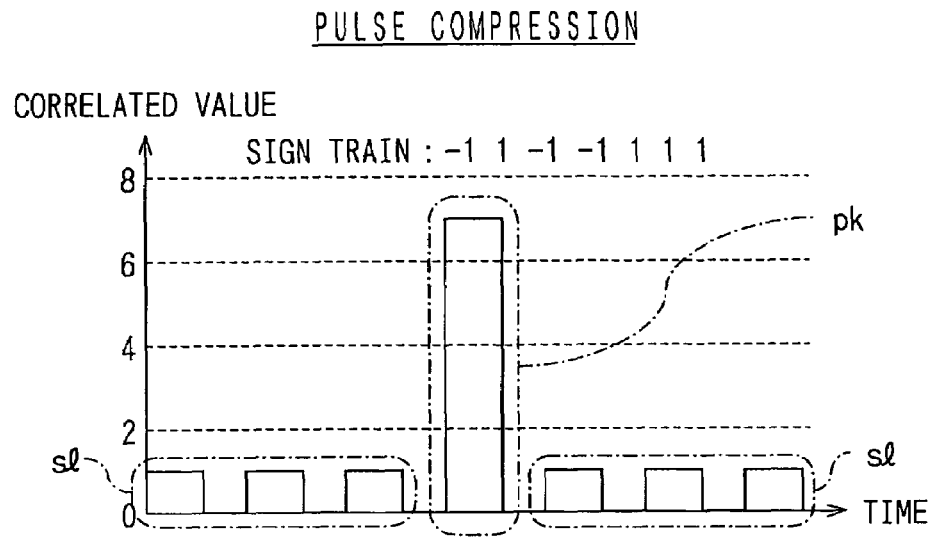
FIG. 16A is a diagram illustrating a combination of signs of a sign train capable of suppressing the level of a side lobe (s1) when finding a correlated value at the time of compressing the pulses without calculating the differential vectors.
Figure 16B:
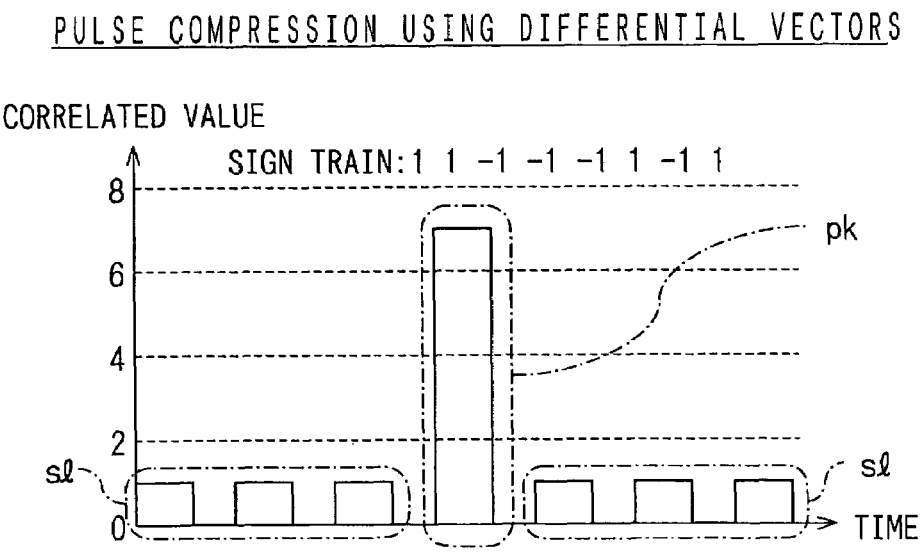
FIG. 16B is a diagram illustrating a combination of signs of a sign train capable of suppressing the level of the side lobe (s1) when finding a correlated value at the time of compressing the pulses by using the differential vectors.

That is, for example, FIG. 16A illustrates a combination of signs of a sign train that is capable of suppressing the side lobe (s1) level when a correlated value is to be found in compressing the pulses without using differential vectors, which is different from FIG. 16B which illustrates a combination of signs of a sign train that is capable of suppressing the side lobe (s1) level when a correlated value is to be found in compressing the pulses by using differential vectors.

When the pulses are to be compressed by using differential vectors, therefore, the side lobe (s1) level is suppressed by compressing the pulses by using a sign train constituted by signs of a combination different from the sign train that is used for compressing the pulses without using differential vectors.

Irrespective of whether the differential vectors are used, therefore, as shown in FIG. 16A it is desired to use a sign train constituted by signs of a combination in which the level of the side lobe (s1) of before the level of at least a correlated value reaches a peak (pk) is smaller than an amount of one code agreement (level of the correlated value is not larger than 1).

That is, when the distance to the reflecting body is to be detected as in the apparatus 200 for detecting a body of this embodiment, the distance is calculated by using a time in which the level of the correlated value assumes a peak (pk). Therefore, the magnitude of the side lobe level after the level of the correlated value assumes that the peak (pk) does not affect the detection of the distance. Therefore, the distance can be correctly detected by using a sign train constituted by signs of a combination in which the side lobe level is not larger than 1 before the level of at least the correlated value assumes the peak.

MODIFIED EXAMPLE 9

The control unit 230 of this embodiment controls the time duration in which the pulse generator 201 continues to generate the pulse signals (f[t]). The time duration may be controlled based on a combination of the characteristics related to the oscillation of the microphone 205 and signs constituting a sign train used in the signal converter 220.

Figure 10:
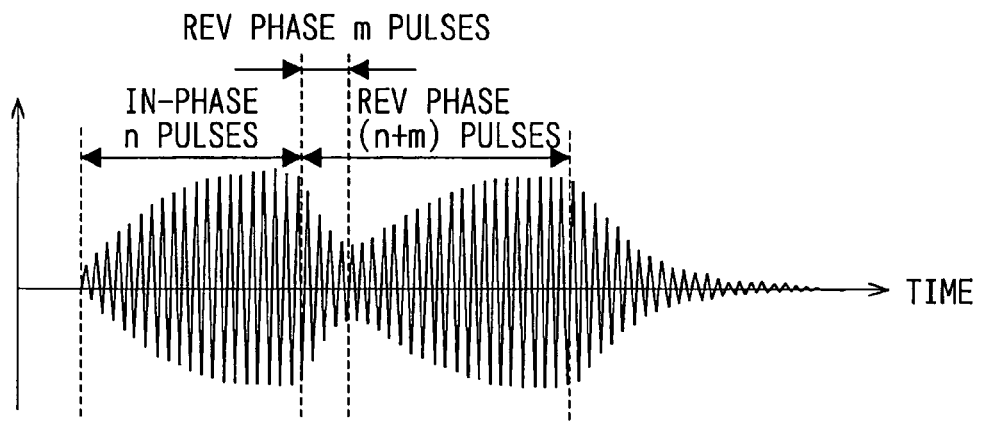
FIG. 10 is a diagram illustrating the waveforms of ultrasonic waves transmitted from the microphone when there are produced modulated signals of a pulse train of an opposite phase consisting of a pulse number (n+m) in which the number of pulses is increased by (m) to cancel the oscillation of the microphone caused by the train of in-phase pulses.

The microphone 205 of this embodiment is of the resonance type having a cover 205b that resonates accompanying the drive of the piezoelectric element 205a. Generally, however, ultrasonic waves transmitted from the resonance type microphone have a low response rate of amplitude and phase for the modulated signals that drive the piezoelectric element 205a. For example, even when the piezoelectric element 205a starts driving, the amplitude of the ultrasonic waves that are transmitted gradually increases as shown in FIG. 10. Further, even when the driving of the piezoelectric element 205a is discontinued, the amplitude gradually decreases.

Therefore, when, for example, the signal converter 220 outputs the modulated signals of a pulse train of a sign different from the pulse train of a preceding sign, the control unit 230 controls the time duration so as to produce the modulated signals of a pulse train of a different sign after the oscillation of the microphone 205 due to the modulated signals of a pulse train of the preceding sign has nearly converged. Therefore, ultrasonic waves having phases that change depending upon the signs can be transmitted from the microphone 205.

MODIFIED EXAMPLE 10

In the above modified example 9, when the modified signals of a pulse train of a sign different from the sign of the preceding pulse train are to be produced by the signal converter 220, the control unit 230 so controls the time duration that the modulated signals of a pulse train of a different sign are output after the oscillation of the microphone 205 due to the modulated signals of the pulse train of the preceding sign being converged. However, the time duration may be so controlled as to produce the modulated signals of a pulse train of a different sign having a number of pulses larger than the number of pulses of the pulse train of the preceding sign.

When, for example, the signal converter 220 is to produce the modulated signals of a pulse train of an opposite phase following the pulse train of the same phase consisting of pulses of a number (n) as shown in FIG. 10, there are produced modulated signals of a pulse train of the opposite phase consisting of pulses of a number (n+m) containing more pulses by a number (m) to offset the oscillation of the microphone 205 due to the pulse train of the same phase.

Unlike the modified example 9, therefore, the modulated signals of a pulse train of a different sign can be output without waiting for the convergence of oscillation of the microphone 205, making it possible to increase the rate of modulation. As a result, the time interval of each pulse train is shortened enhancing the resolution of distance in detecting the distance to the body.

MODIFIED EXAMPLE 11

In the above modified examples 9 and 10, when the modified signals of a pulse train of a sign different from the sign of the preceding pulse train are to be produced by the signal converter 220, the pulse generator 201 controls the time duration for continuously generating the pulse signals (f[t]). When the signal generator 220 produces modulated signals of a pulse train of a sign same as the sign of the preceding pulse train, however, the time duration may be so controlled as to produce the modulated signals of a pulse train of the same sign having a number of pulses smaller than the number of pulses of the pulse train of the preceding sign.

For example, when the phase modulation is repeated before the amplitude of the ultrasonic waves (transmission waves) transmitted from the (resonance) microphone 205 reaches the saturation point, modulated signals of a sign same as the preceding sign are produced to increase the amplitude of the ultrasonic waves (transmission waves), which is no longer the same as the amplitude of the other sign.

Therefore, when the modulated signals of a sign same as the preceding sign are to be produced, there are produced modulated signals of a pulse train of a number of pulses smaller than the number of pulses of the pulse train of the preceding sign. Namely, there are produced modulated signals of a pulse train containing a blank portion which produces no pulse. This makes it possible to maintain constant the amplitude of the ultrasonic waves (transmission waves).

MODIFIED EXAMPLE 12

In the above modified examples 9 and 10, when the modified signals of a pulse train of a sign different from the sign of the preceding pulse train are to be produced by the signal converter 220, the pulse generator 201 controls the time duration for continuously generating the pulse signals (f[t]). In this modified example, however, the phase converter 220 gradually varies the phases of pulse in the pulse train of the preceding sign before producing the modulated signals of a pulse train of a different sign at the time of producing the modulated signals of a pulse train of a sign different from the sign of the preceding pulse train.

Usually, the microphone 205 which resonates accompanying the drive of the piezoelectric element 205a has a low response speed for the phase modulation. By taking the low response speed into consideration, therefore, the phases of pulses in the pulse train of the preceding sign are gradually varied before the modulated signals of a pulse train of a different sign are output in producing the modulated signals of a pulse train of a sign different from the pulse train of the preceding sign by the phase converter 220. Therefore, the microphone 205 transmits the transmission waves of which the phases are modulated at suitable timings.

Third Embodiment

Figure 19:
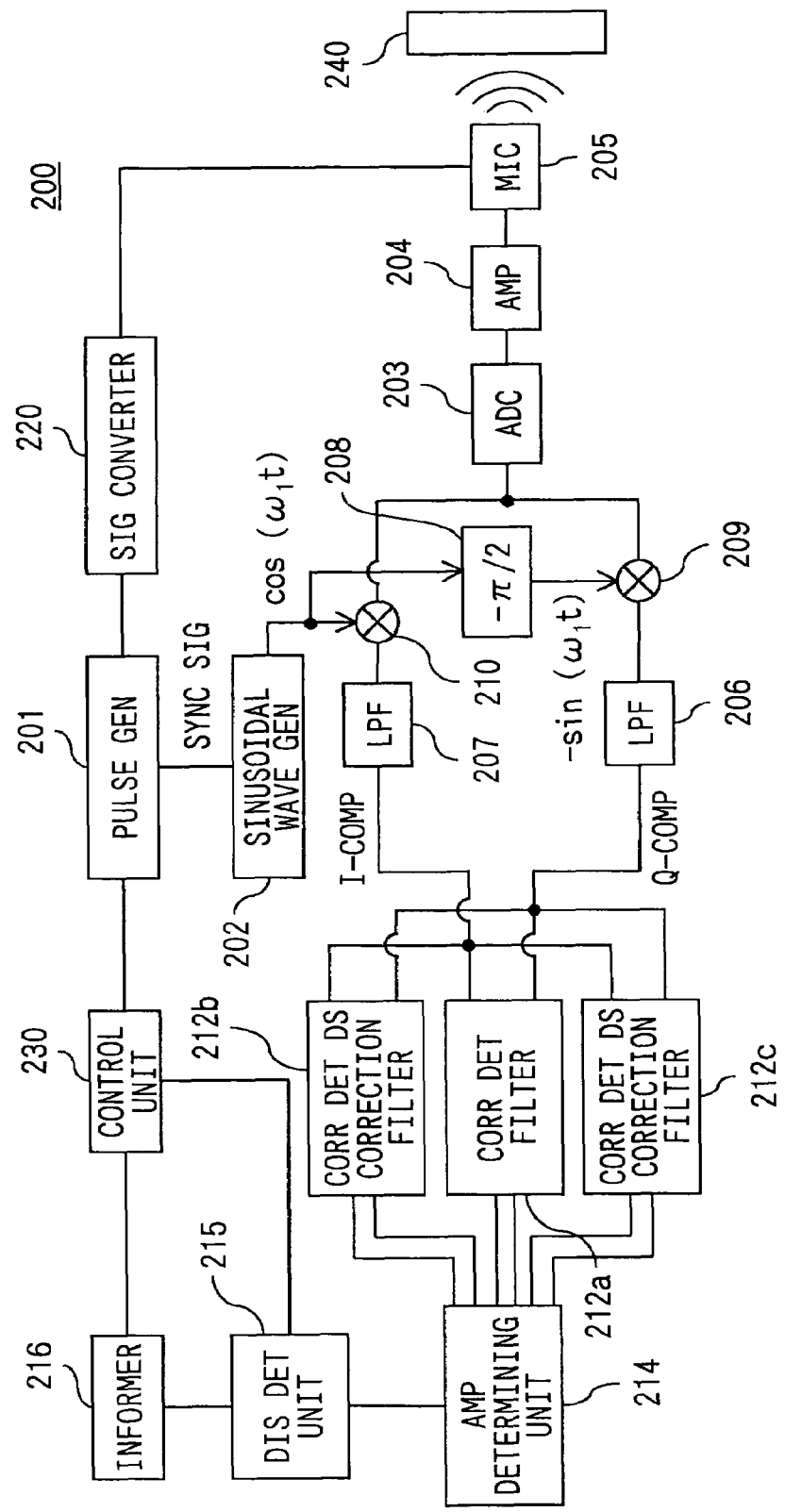
FIG. 19 is a diagram illustrating the constitution of the apparatus for detecting a body according to a third embodiment.

FIG. 19 is a diagram illustrating the constitution of an apparatus for detecting a body according to this embodiment. As shown, an apparatus 200 for detecting a body of the embodiment is constituted by a pulse generator 201, a sinusoidal wave generator 202, an ADC (analog/digital converter) 203, an AMP (amplifier) 204, a microphone 205, LPFs (low-pass filters) 206 and 207, a phase shifter 208, multipliers 209 and 210, and a signal converter 220.

Further, the apparatus 200 for detecting a body includes a microcomputer that is not shown, and has calculation processing functions such as of a correlation detecting filter 212a, correlation detecting DS (Doppler shift) correction filters 212b, 212c, an amplitude determining unit 214, a distance detecting unit 215, an informing unit 216 and a control unit 230.

The pulse generator 201 generates burst pulse signals (hereinafter simply called pulse signals f[t]) of an angular frequency ($\omega$) constituted by a plurality of pulse trains of a plurality of pulses, and sends the pulse signals (f[t]) to the signal converter 220. The control unit 230 controls the time duration for continuously generating the pulses.

The signal converter 220 digitally modulates the phases of the pulse signals (f[t]) by the sign of the phases, i.e., changes the phases for each pulse train of pulse signals (f[t]) according to a sign train constituted by a combination of a plurality of signs.

The sinusoidal wave generator 202 generates sine waves of a given angular frequency ($\omega_1$). The sinusoidal wave generator 202 of this embodiment is capable of also generating sine waves of an angular frequency in synchronism with the angular frequency ($\omega$) of the pulse signals (f[t]) output from the pulse generator 201. The sine wave signals generated by the sinusoidal wave generator 202 are output to the phase shifter 208 and to the multiplier 210.

The microphone 205 is an ultrasonic wave sensor which, as shown in FIG. 9A, is constituted by a piezoelectric element 205a and a cover 205b surrounding the piezoelectric element 205b. The microphone 205 is a resonance type microphone of which the cover 205b resonates accompanying the drive of the piezoelectric element 205a.

That is, the microphone 205 is such that when the modulated signals obtained by changing the phase of the pulse signals (f[t]) through the signal converter 220 are fed to the piezoelectric element 205a, the piezoelectric element 205a is driven causing the cover 205b to resonate, and ultrasonic waves generated thereby are transmitted to an external body 240 that is to be detected.

By varying the phase of the pulse signals (f[t]) for driving the piezoelectric element 205a as described above, the phase of the waves transmitted from the microphone 205 can be digitally modulated.

FIG. 9B is a diagram illustrating the amplitude of ultrasonic waves transmitted from the microphone 205 and of which the phases are modulated, and FIG. 9C is a diagram illustrating a change in the phase. As for the signs of a sign train of this embodiment as shown, a sign "−1" is assigned to a pulse train which delays the phase of the pulse train of pulse signals (f[t]) by ($\pi/2$) and, conversely, a sign "1" is assigned to a pulse train which advances the phase of the pulse train by ($\pi/2$).

Further, the microphone 205 receives the reflected ultrasonic waves transmitted thereby. Upon receiving the reflected waves, the piezoelectric element 205a generates a voltage. The generated voltage is amplified to a predetermined number of times through the AMP 204, and is output to the ADC 203.

The ADC 203 samples the received signals output from the AMP 204 at a predetermined sampling frequency (e.g., several times of the frequency of the pulse signals f[t]), converts them into digital signals, and outputs the received signals that have been converted to the multipliers 209 and 210.

The apparatus 200 for detecting a body of this embodiment employs only one microphone 205 but may employ a plurality of microphones 205. In this case, a switch is provided for changing over the plurality of microphones, and is controlled so as to be changed over at regular intervals to change the microphones that are to be used.

By using the plurality of microphones, therefore, it is allowed to detect the bodies existing in a multiplicity of directions of the vehicle. In this case, the constitution can be used in common except the microphones 205 to reduce the cost of the apparatus 200 for detecting the body.

The phase shifter 208, multipliers 209, 210, and LPFs 206, 207 are used for orthogonally demodulating the received signals from the ADC 203. That is, the sign wave signals from the sinusoidal wave generator 202 are divided into two, the one part thereof being input to the multiplier 209 after the phase thereof is changed through the phase shifter 208, and the other part thereof being directly input to the multiplier 210. The received signals from the ADC 203 are multiplied through the multipliers 209, 210, filtered through the LPFs 206 and 207 to remove high-frequency components, and are demodulated.

The phase shifter 208 shifts the phases of the sine wave signals from the sinusoidal wave generator 202 to a predetermined phase (e.g., $-\pi/2$). The multiplier 210 multiplies the received signals from the ADC 203 by the sine wave signals from the sinusoidal wave generator 202, and the multiplier 209 multiplies the received signals from the ADC 203 by the sine wave signals of which the phases are shifted through the phase shifter 208. Thus, the received signals are separated into in-phase components (I-components) and orthogonal components (Q-components).

The LPFs 206 and 207 are used for removing the high-frequency components contained in the I-components and Q-components of received signals output from the multipliers 209 and 210. The received signals of I-components and Q-components from which the high-frequency components have been removed are output to the correlation detecting filter 212a and to the correlation detecting DS correction filters 212b, 212c.

The correlation detecting filter 212a is for compressing the pulse width of the received signals, i.e., multiplies the sign of the received signals by a conjugated complex sign of the modulated signals a plurality of number of times at timings that differ in time relative to the received signals, adds up the multiplied results, averages the added results, and finds a correlated value of the received signals and the modulated signals for each I-component and Q-component. The correlation detecting filter 212a sends a correlated value signal of each I-component and Q-component to the amplitude determining unit 214.

The correlation detecting DS correction filters 212b and 212c correct the Doppler shift in the received signals by using correction signals for correcting the Doppler shift in the received signals, and compress the pulse width of the received signals of which the Doppler shift has been corrected.

That is, the received signals are multiplied by a conjugated complex signal of the modulated signals a plurality of number of times at timings that differ in time relative to the received signals, the multiplied results are added up, and the added results are averaged to find a correlation. Here, the Doppler shift in the received signals of the reflected waves is corrected in a step prior to adding up the multiplied results.

Therefore, a change in the phase due to the Doppler shift is not added, and the vectors of the received signals do not rotate on the IQ plane. The correlation detecting DS correction filters 212b, 212c send the correlated value signal for each I-component and Q-component to the amplitude determining unit 214.

When the use of the apparatus 200 for detecting a body of this embodiment has been specified, the range of speed relative to the body to be detected can be presumed in advance. Therefore, different frequencies are set for the correction signals of the correlation detecting DS correction filters 212b, 212c to cover the frequency band of Doppler shift depending upon the range of relative speed that is presumed.

For example, the frequency of correction signals of the correlation detecting DS correction filter 212b is so set as to be corresponded to a relative speed (about several kilometers per hour) when the position of the body to be detected is approaching, and the frequency of correction signals of the correlation detecting DS correction filter 212c is so set as to be corresponded to a relative speed (about several kilometers per hour) when the position of the body to be detected is separating away.

Therefore, the amplitude determining unit 214 detects the body based on the received signals having the highest correction, i.e., detects the body from the received signals of which the Doppler shift is properly corrected in the presumed range of relative speeds.

The amplitude determining unit 214 calculates the amplitudes of the received signals from the correlated value signal of each I-component and Q-component from the correlation detecting filter 212a and the correlation detecting DS correction filters 212b, 212c. When the amplitudes of the received signals are greater than the preset amplitude level (threshold value), the amplitude determining unit 214 determines the time in which the amplitudes are greater than the preset amplitude level to be a timing (reception timing) of receiving the reflected waves.

The amplitude level used for determining the threshold value of the amplitude determining unit 214 has been set for the received signals from the correlation detecting filter 212a and the correlation detecting DS correction filters 212b, 212c. The threshold value is determined by the amplitude level corresponding to the received signals.

It is also allowable to add up the amplitudes of the received signals relying upon the correlated value signals of the I-components and Q-components from the correlation detecting filter 212a and the correlation detecting DS correction filters 212b, 212c, and determine whether the amplitude of the received signals added up is greater than the preset amplitude level. Therefore, the body can be detected without determining the threshold value concerning the amplitude of the received signals, and the amount of processing can be decreased.

The distance detecting unit 215 detects the distance to the reflecting body from a time difference between a timing of generating pulse signals (f[t]) (or, in other words, a timing for transmitting the ultrasonic waves from the microphone) and a timing for receiving the reflected waves. When the distance detected by the distance detecting unit 215 becomes within a predetermined distance, the informing unit 216 generates an alarm to inform the driver of the vehicle of a body that is approaching.

In this embodiment, the Doppler shift in the received signals is corrected by using a correction signal for correcting the Doppler shift, and a correlation is found from the modulated signals and the received signals after the Doppler correction in order to improve the SN ratio of the received signals.

That is, as described above, the conventional method of compressing the pulses is based on a prerequisite of being used for detecting a static body (which is not in motion) (the same holds even for the correlation detecting filter 212a shown in FIG. 19), and is not capable of favorably compressing the received signals of the waves reflected by a body that is in uniform motion.

This is because when a body is in uniform motion, the frequency of the received signals of the reflected waves shifts due to the Doppler effect, and a correlation to the modulated signals is not maintained at the time of compressing the pulses. As a result, the pulse widths of the received signals are not favorably compressed.

Therefore, the apparatus 200 for detecting a body of this embodiment is provided with the correlation detecting DS correction filters 212b, 212c, and compresses the pulse width of the received signals after having been corrected for the Doppler shift in order to improve the SN ratio of the received signals.

A characteristic portion of this embodiment will now be described. First, the pulse generator 201 generates the pulse signals (f[t]) of the angular frequency ($\omega$) as transmission signals and transmits the transmission signals while digitally modulating the phases thereof. In this case, the fundamental component of the transmission waves is expressed by the following formula (40), $$\text{Transmission waves} = f[t] \times \cos(\omega t + \theta[t]) \tag{40}$$

where $\theta[t]$ is a function representing a phase modulation component.

If the received signals of reflection waves having a frequency component nearly equal to the transmission waves are orthogonally demodulated by using sine wave signals of an angular frequency ($\omega_1 t+\theta 2$) and are separated into the in-phase component and the orthogonal component of the demodulated signals, the demodulated signals as expressed by the following formula (41), $$\text{Demodulated signals}=f[t]\times\cos(\omega t+\theta[t])\times\cos(\omega_1 t+\theta 2)+j\{f[t]\times\cos(\omega t+\theta[t])\times-\sin(\omega_1 t+\theta 2)\}=(1/2)\times f[t]\times\{\cos(\omega t+\theta[t]+\omega_1 t+\theta 2)+\cos(\omega t+\theta[t]-\omega_1 t-\theta 2)\}-(1/2)\times j\{\sin(\omega t+\theta[t]+\omega_1 t+\theta 2)+\sin(-\omega t-\theta[t]+\omega_1 t+\theta 2)\} \quad (41)$$

where $\theta 2$ is a phase difference produced when the transmission wave propagates through a passage along which it is reflected by the body to be detected and is received.

When the orthogonal demodulation is effected with the sine wave signals of the angular frequency ($\omega_1=\omega$) in synchronism with the angular frequency ($\omega$) of pulse signals (f[t]), the demodulated signals are expressed by the following formula (42), $$\text{Demodulated signals}=(1/2)\times f[t]\times\{\cos(\omega t+\theta[t]+\omega t+\theta 2)+\cos(\omega t+\theta[t]-\omega t-\theta 2)-(1/2)\times j\{\sin(\omega t+\theta[t]+\omega t+\theta 2)+\sin(-\omega t-\theta[t]+\omega t+\theta 2)\}=(1/2)\times f[t]\times\{\cos(2\omega t+\theta[t]+\theta 2)+\cos(\theta[t]-\theta 2)\}-(1/2)\times j\{\sin(2\omega t+\theta[t]+\theta 2)+\sin(-\theta[t]+\theta 2)\} \quad (42)$$

If the component of a frequency twice as great as the angular frequency ($\omega$) is removed from demodulated signals expressed by the above formula (42) by using a low-pass filter (LPF) having a function of the orthogonal demodulation means, the output from the LPF is expressed by the following formula (43), $$LPF\text{ output}=(1/2)\times f[t]\times+\cos(\theta[t]-\theta 2)+j(1/2)\times\sin(\theta[t]-\theta 2)=A\times f\{t\}\times e^{j(\theta[t]-\theta 2)} \quad (43)$$

where A is a constant.

As described above, the orthogonal demodulation is effected by using sine wave signals of an angular frequency in synchronism with the angular frequency ($\omega$) of pulse signals f[t] and the component of a frequency twice as high contained in the demodulated signals is removed therefrom to pick up the amplitude (A) component and the phase component ($\theta[t]-\theta 2$) of the received signals. The method of picking up the amplitude component and the phase component of the received signals is not limited to the one of the above orthogonal demodulation.

Here, in order to find a correlation between the received signals that have not been affected by the Doppler effect and the demodulated signals, the received signals are multiplied by a conjugated complex signal corresponding to a conjugated complex number of the modulated signals a plurality of number of times at timings that differ in time relative to the received signals, and the multiplied results are added up, and the added results are averaged according to the following formula (44), $$(1/N)\times\Sigma\{A\times f[t]\times e^{j(\theta[t]-\theta 2)}\times e^{-j\theta[t]}\}=(1/N)\times\Sigma\{A\times f[t]\times e^{-j\theta 2}\} \quad (44)$$

where (N) is a number of signs of the sign train (unit of modulation).

If the calculated result of the above formula 44 is shown on a complex plane (IQ plane) comprising the in-phase component (I) and the orthogonal component (Q), there is obtained a vector in a predetermined direction (a point on the IQ plane) in a section of transmitting the transmission signals.

By adding and averaging the multiplied results, further, there is obtained a vector of a magnitude proportional to the number of times of addition. As for the noise contained in the received signals, on the other hand, there is no correlation between the noise signals that are received and the modulated signals even when there are received waves of a frequency nearly equal to the transmission waves. Therefore, the noise becomes random on the IQ plane, and the vectors thereof are small.

However, when the received signals of waves reflected, for example, by a body that is in uniform motion are to be compressed, the frequency of the received signals of the reflected waves is shifted by the Doppler effect, and a result is obtained as expressed by the following formula (45), $$(1/N)\times\Sigma\{A\times f[t]\times e^{-j\theta 2}\times e^{j\Delta\theta[t]}\} \quad (45)$$

wherein $\Delta\theta[t]$ is a function representing a change in the phase due to the Doppler shift.

This means that when the waves are received for a period of time corresponding to a section for transmitting the transmission signals, the amount of phase change due to the Doppler shift is added in the step of compressing the pulses whence the vectors of the received signals turn on the IQ plane making it difficult to favorably compress the pulse width of the received signals.

In this embodiment, therefore, in determining a correlation between the received signals affected by the Doppler effect and the modulated signals, the Doppler shift of the received signals is corrected by using correction signals for correcting the Doppler shift in the received signals, a correlation is found from the received signals that are corrected and the demodulated signals, and the received signals are compressed relying upon the result thereof. In the following formula (46), ($e^{-j\Delta\theta[t]}$) corresponds to the above correction signal (correction term).

$$(1/N)\times\Sigma(\{A\times f[t]\times e^{-j\theta 2}\times e^{j\Delta\theta[t-1]}\}\times\{e^{-j\Delta\theta[t]}\})=(1/N)\times\Sigma\{A\times f[t]\times e^{-j\theta 2}\} \quad (46)$$

From the result calculated according to the above formula, it will be learned that the frequency of the amount of Doppler shift in the received signals has been removed. If the calculated result is shown on the IQ plane, there is obtained a predetermined phase difference ($\theta 2$) in the section for transmitting the transmission signals, i.e., a vector representing a point on the IQ plane. By adding and averaging the multiplied results, further, there is obtained a vector of a magnitude proportional to the number of times of addition.

As described above, the apparatus 200 for detecting a body of this embodiment is provided with the correlation detecting DS correction filters 212b, 212c to compress the pulse width of the received signals after the Doppler shift thereof has been corrected. Therefore, even when the frequency of the received signals is shifted due to the Doppler effect, a difference can be distinguished between a peak of the correlated value representing the degree of correlation and the correlated value other than the peak (i.e., side lobe). As a result, the SN ratio of the received signals can be improved.

MODIFIED EXAMPLE 13

The apparatus 200 for detecting a body of this embodiment is provided with the correlation detecting DS correction filters 212b and 212c for correcting the Doppler shift in the received signals and for compressing the pulse widths of the received signals after the Doppler shift thereof has been corrected.

Figure 20:
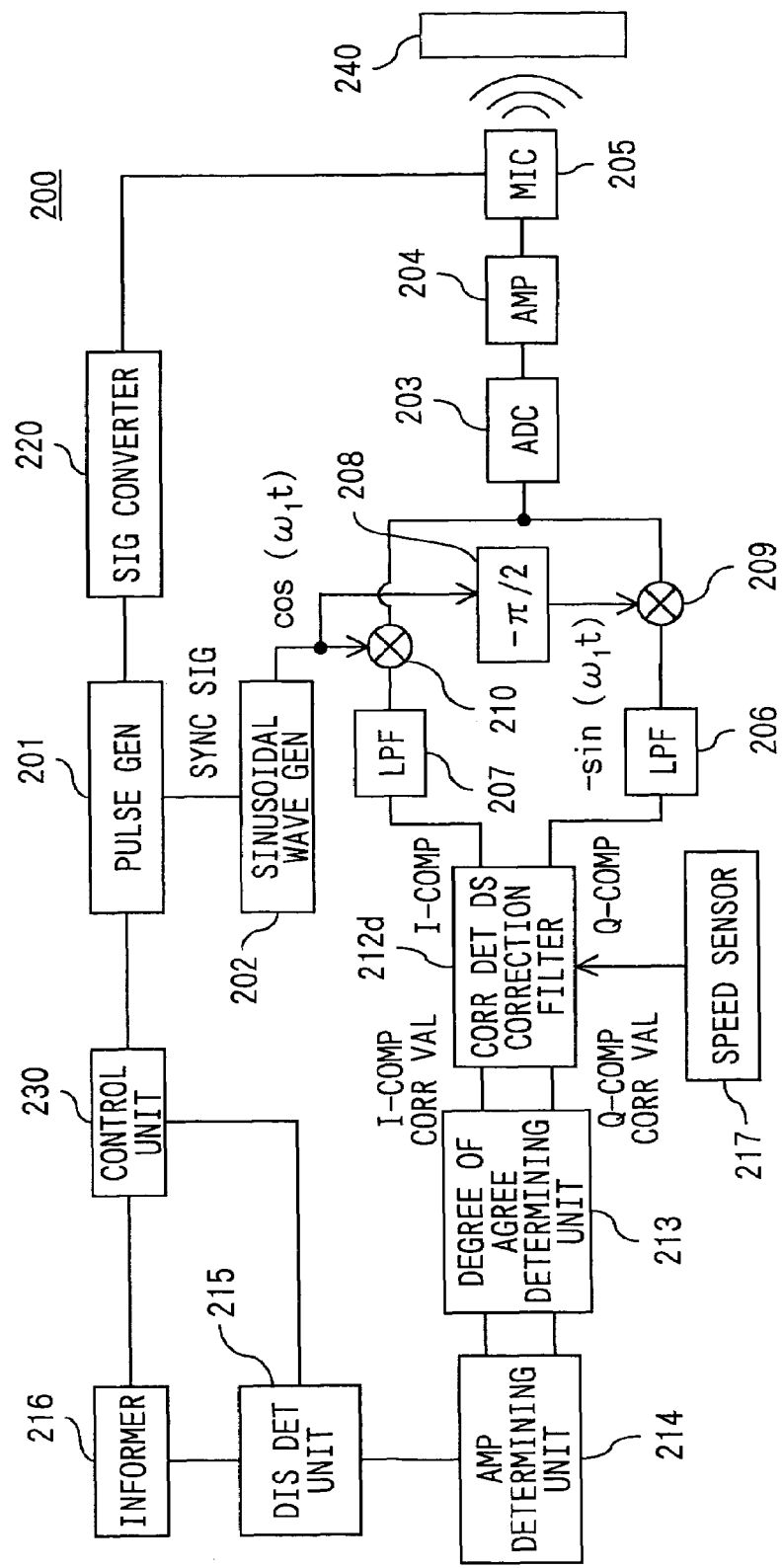
FIG. 20 is a diagram illustrating the constitution of the apparatus for detecting a body according to a modified example of the third embodiment.

In this modified example, on the other hand, provision is made of the correlation detecting DS correction filter 212d capable of varying the frequency of the correction signals and the vehicle sensor 217 for detecting the moving speed of the vehicle as shown in FIG. 20 to calculate the frequency of the Doppler shifting amount from the speed of the vehicle, to vary the frequency of the correction signals ($e^{-j\Delta\theta[t]}$) depending upon the calculated frequency, and to effect the correction by using the correction signals that are varied. This improves the SN ratio of the received signals of waves reflected by the static body.

Here, it is also allowable to transmit the transmission waves once, detect the phase shift (Δθ) due to the Doppler shift from the received signals of the reflected waves, calculate the frequency of the correction signals ($e^{-j\Delta\theta[t]}$) for correcting the Doppler shift, and change the frequency into the thus calculated frequency.

MODIFIED EXAMPLE 14

In the apparatus 200 for detecting a body of the embodiment, the frequency of correction signals of the correlation detecting DS correction filter 212b is so set as to be corresponded to a relative speed (about several kilometers per hour) when the position of the body to be detected is approaching, and the frequency of correction signals of the correlation detecting DS correction filter 212c is so set as to be corresponded to a relative speed (about several kilometers per hour) when the position of the body to be detected is separating away.

When the apparatus 200 for detecting a body is mounted on a moving body such as a vehicle, however, the body moving away from the moving body is, usually, unlikely to collide. Therefore, there is no need of detecting the body that is moving away.

Therefore, the frequencies of correction signals of the correlation detecting DS correction filters 212b and 212c are set to correspond to the relative speeds of the position of the body to be detected when it is approaching. Accordingly, there is no need of providing the correlation detecting DS correction filter for the relative speed of when the position of the body to be detected is moving away, and the constitution of the apparatus can be simplified.

MODIFIED EXAMPLE 15

The control unit 230 of this embodiment controls the time duration in which the pulse generator 201 continues to generate the pulse signals (f[t]). The time duration may be controlled based on a combination of the characteristics related to the oscillation of the microphone 205 and signs constituting a sign train used in the signal converter 220.

The microphone 205 of this embodiment is of the resonance type having a cover 205b that resonates accompanying the drive of the piezoelectric element 205a. Generally, however, ultrasonic waves transmitted from the resonance type microphone have a low response rate of amplitude and phase for the modulated signals that drive the piezoelectric element 205a. For example, even when the piezoelectric element 205a starts driving, the amplitude of the ultrasonic waves that are transmitted gradually increases as shown in FIG. 10. Further, even when the driving of the piezoelectric element 205a is discontinued, the amplitude gradually decreases.

Therefore, when, for example, the signal converter 220 outputs the modulated signals of a pulse train of a sign different from the pulse train of a preceding sign, the control unit 230 controls the time duration so as to produce the modulated signals of a pulse train of a different sign after the oscillation of the microphone 205 due to the modulated signals of a pulse train of the preceding sign has nearly converged. Therefore, ultrasonic waves having phases that change depending upon the signs can be transmitted from the microphone 205.

MODIFIED EXAMPLE 16

In the above modified example 15, when the modified signals of a pulse train of a sign different from the sign of the preceding pulse train is to be produced by the signal converter 220, the control unit 230 so controls the time duration that the modulated signals of a pulse train of a different sign are output after the oscillation of the microphone 205 due to the modulated signal of the pulse train of the preceding sign is converged. However, the time duration may be controlled to produce the modulated signals of a pulse train of a different sign having a number of pulses larger than the number of pulses of the pulse train of the preceding sign.

When, for example, the signal converter 220 produces the modulated signals of a pulse train of an opposite phase following the pulse train of the same phase consisting of pulses of a number (n) as shown in FIG. 10, there are produced modulated signals of a pulse train of the opposite phase consisting of pulses of a number (n+m) containing more pulses by a number (m) to offset the oscillation of the microphone 205 due to the pulse train of the same phase.

Unlike the modified example 15, therefore, the modified signals of a pulse train of a different sign can be output without waiting for the convergence of oscillation of the microphone 205, making it possible to increase the rate of modulation. As a result, the time interval of each pulse train is shortened enhancing the resolution of distance in detecting the distance to the body.

MODIFIED EXAMPLE 17

In the above modified examples 15 and 16, when the modified signals of a pulse train of a sign different from the sign of the preceding pulse train are to be produced by the signal converter 220, the pulse generator 201 controls the time duration for continuously generating the pulse signals (f[t]). When the signal generator 220 produces modulated signals of a pulse train of a sign same as the sign of the preceding pulse train, however, the time duration may be so controlled as to produce the modulated signals of a pulse train of the same sign having a number of pulses smaller than the number of pulses of the pulse train of the preceding sign.

For example, when the phase modulation is repeated before the amplitude of the ultrasonic waves (transmission waves) transmitted from the (resonance) microphone 205 reaches the saturation point, modulated signals of a sign same as the preceding sign are produced to increase the amplitude of the ultrasonic waves (transmission waves), which is no longer the same as the amplitude of the other sign.

Therefore, when the modulated signals of a sign same as the preceding sign are to be produced, there are produced modulated signals of a pulse train of a number of pulses smaller than the number of pulses of the pulse train of the preceding sign. Namely, there is produced modulated signals of a pulse train containing a blank portion which produces no pulse. This makes it possible to maintain constant the amplitude of the ultrasonic waves (transmission waves).

MODIFIED EXAMPLE 18

In the above modified examples 15 and 16, when the modified signals of a pulse train of a sign different from the sign of the preceding pulse train are to be produced by the signal converter 220, the pulse generator 201 controls the time duration for continuously generating the pulse signals (f[t]). However, the phase converter 220 may gradually vary the phases of pulses in the pulse train of the preceding sign before producing the modulated signals of a pulse train of a different sign at the time of producing the modulated signals of a pulse train of a sign different from the sign of the preceding pulse train.

Usually, the microphone 205 which resonates accompanying the drive of the piezoelectric element 205a has a low response speed for the phase modulation. By taking the low response speed into consideration, therefore, the phases of pulses in the pulse train of the preceding sign are gradually varied before the modulated signals of a pulse train of a different sign are output in producing the modulated signals of a pulse train of a sign different from the pulse train of the preceding sign by the phase converter 220. Therefore, the microphone 205 transmits the transmission waves of which the phases are modulated at suitable timings.

MODIFIED EXAMPLE 19

In the amplitude determining unit 214 of this embodiment, the amplitudes of the received signals are calculated from the correlated value signals of the I-components and Q-components from the correlation detecting filter 212a and the correlation detecting DS correction filters 212b, 212c. Therefore, the destination (either one of the correlation detection filter 212a or the correlation detecting DS correction filters 212b, 212c) may be specified for sending a correlation value signal having the highest correlation, in order to detect the speed relative to the body or a change in the positional relationship to the body (approaching/separating away).

MODIFIED EXAMPLE 20

In the apparatus 200 for detecting a body of this embodiment, at least either the pulse generator 210 or the signal converter 220 may be so constituted as to vary at least one of the number of signs constituting the sign train, the number of pulse trains constituting the transmission signals, or the number of pulses in the pulse trains depending upon the distance to the body to be detected.

By varying at least any one of the number of signs constituting a sign train, the number of pulse trains constituting the transmission signals or the number of pulses of the pulse train, the transmission waves are not overlapped on the reflected waves in the transmitter/receiver means when the waves are transmitted and received repetitively by the transmitter/receiver means.

What is claimed is:

1. An apparatus for detecting a body, comprising:
    transmission signal-generating means for generating transmission signals;
    modulation means for producing modulated signals by modulating the transmission signals generated by the transmission signal-generating means;
    transmitter/receiver means for transmitting the modulated signals produced by the modulation means as transmission waves and for receiving the reflected waves thereof;
    pulse compressing means for finding a correlation between received signals of the reflected waves received by the transmitter/receiver means and the modulated signals, and for compressing the received signals; and
    body detecting means for detecting a body based on the transmitted signals and the received signals that are compressed;
    wherein, in finding a correlation, the pulse compressing means multiplies the received signals by a conjugated complex signal of the modulated signals a plurality of number of times at timings that differ in time relative to the received signals, operates a differential vector between the multiplied result and the preceding multiplied result for each unit of modulation, adds up the calculated differential vectors for each unit of modulation, and averages the added results to find the correlation;
    wherein the pulse compressing means includes Doppler shift correction means for correcting the Doppler shift in the received signals of the reflected waves by using correction signals for correcting the Doppler shift in the received signals;
    wherein the pulse compressing means determines a correlation between the demodulated signals and the received signals after the Doppler shift has been corrected by the Doppler shift correction means, and compresses the pulses thereof relying upon the result thereof;
    wherein the Doppler shift correction means have different frequencies of correction signals, wherein the body detecting means detects the body based on the received signals from the Doppler shift correction means;
    wherein the pulse compressing means find a correlated value that represents a degree of correlation between the received signals after the Doppler correction and the modulated signals, and compress the received signals relying on the correlated value; and
    wherein body detecting means adds up the received signals compressed by the pulse compressing means, executes the threshold value determination to determine the magnitude of amplitude of the received signals that are added up relative to a preset level of amplitude to detect the body based on the result of determination.

2. An apparatus for detecting a body according to claim 1, wherein the Doppler shift correction means includes a correction signal varying means for varying the frequency of the correction signals, and effects the correction by using correction signals varied by the correction signal varying means.

3. An apparatus for detecting a body according to claim 2, which is mounted on a moving body and includes moving speed detecting means for detecting the moving speed of the moving body, and wherein the correction signal-varying means calculates the frequency of the Doppler shifting amount from the moving speed detected by the moving speed detecting means, and varies the frequency of the correction signals relying upon the calculated frequency.

4. An apparatus for detecting a body according to claim 1, wherein the Doppler shift correction means and the pulse compressing means effects the correction by using correction signals for correcting the Doppler shift in the received signals of reflected waves when the position of the body to be detected is approaching.

5. An apparatus for detecting a body according to claim 1, wherein the body detecting means detects at least either a change in the speed relative to the body or a change in the positional relationship to the body based on the received signals compressed by the pulse compressing means.

6. An apparatus for detecting a body according to claim 1, wherein: the pulse compressing means find a correlated value that represents a degree of correlation between the received signals after the Doppler correction and the modulated signals, and compress the received signals relying on the correlated value; and the body detecting means effects the threshold value determination to determine the amplitudes of the received signals compressed by the pulse compressing means relative to a preset amplitude level, and detects the body based on the determined result.

7. An apparatus for detecting a body according to claim 1, wherein: the transmission signal-generating means generates transmission signals constituted by a plurality of pulse trains of a plurality of pulses; the demodulation means produces demodulated signals by digitally demodulating at least any one of the amplitude, frequency or phase of the transmission signals generated by the transmission signal-generating means for each pulse train of the transmission signals according to a sign train constituted by a combination of a plurality of signs; and the pulse compressing means finds a correlation between the signs of the received signals of reflected waves received by the transmitter/receiver means and of the demodulated signals.

8. An apparatus for detecting a body according to claim 7, wherein the transmitter/receiver means includes a resonance type microphone which drives a piezoelectric element to resonate accompanying the drive thereof, and the modulation means produces modulated signals obtained by modulating the phase of the transmission signals to drive the piezoelectric element.

9. An apparatus for detecting a body according to claim 8, wherein the transmission signal-generating means includes control means for controlling the time duration for continuously generating the transmission signals based upon a combination of the oscillating characteristics of the resonance type microphone and the signs constituting the sign train.

10. An apparatus for detecting a body according to claim 9, wherein, when the modulation means produces the modulated signals of a pulse train of a sign different from the sign of the preceding pulse train, the control means controls the time duration so as to produce the modulated signals of a pulse train of a different sign nearly after the convergence of oscillation of the resonance type microphone oscillated by the modulated signals of the pulse train of the preceding sign.

11. An apparatus for detecting a body according to claim 9, wherein, when the modulation means produce the modulated signals of a pulse train of a sign different from the sign of the preceding pulse train, the control means controls the time duration so as to produce the modulated signals of a pulse train of a different sign including pulses of a number greater than the number of pulses of the pulse train of the preceding sign.

12. An apparatus for detecting a body according to any one of claims 9 to 11, wherein, when the modulation means produces the modulated signals of a pulse train of a sign same as the sign of the preceding pulse train, the control means controls the time duration so as to produce the modulated signals of a pulse train of the same sign including pulses of a number smaller than the number of pulses of the pulse train of the preceding sign.

13. An apparatus for detecting a body according to claim 9, wherein, while producing the modulated signals of a pulse train of a sign different from the sign of the preceding pulse train, the modulation means gradually varies the phases of pulses in the pulse train of the preceding sign prior to producing the modulated signals of a pulse train of a different sign.

14. An apparatus for detecting a body according to claim 1, further comprising: sinusoidal wave-generating means for generating sinusoidal wave signals of a frequency in synchronism with the frequency of the transmission signals or of a frequency nearly equal to the resonance frequency of the resonance type microphone; and orthogonal demodulation means which orthogonally demodulates the received signals of reflected waves received by the transmitter/receiver means by using sinusoidal wave signals generated by the sinusoidal wave-generating means, and produces the in-phase components and the orthogonal components of the received signals that are demodulated; wherein the pulse compression means compresses the received signals that are demodulated by the orthogonal demodulation means.

15. An apparatus for detecting a body according to claim 7, wherein at least either the transmission signal-generating means or the modulation means is capable of varying at least any one of the number of signs constituting a sign train, the number of pulse trains constituting the transmission signals or the number of pulses of the pulse trains depending upon the distance to the body to be detected.

* * * * *